US012617885B2

(12) United States Patent
Niimura et al.

(10) Patent No.: US 12,617,885 B2
(45) Date of Patent: May 5, 2026

---

(54) IONOMER RESIN, RESIN SHEET, AND LAMINATED GLASS

(71) Applicant: KURARAY EUROPE GMBH, Hattersheim am Main (DE)

(72) Inventors: Takuro Niimura, Tsukuba (JP); Kenta Takemoto, Tsukuba (JP); Atsuhiro Nakahara, Tsukuba (JP); Yoshiaki Asanuma, Kurashiki (JP)

(73) Assignee: Kuraray Europe GmbH, Hattersheim (DE)

( * ) Notice: Subject to any disclaimer, the term of this patent is extended or adjusted under 35 U.S.C. 154(b) by 502 days.

(21) Appl. No.: 18/028,781

(22) PCT Filed: Sep. 22, 2021

(86) PCT No.: PCT/JP2021/034820
§ 371 (c)(1),
(2) Date: Mar. 28, 2023

(87) PCT Pub. No.: WO2022/071065
PCT Pub. Date: Apr. 7, 2022

(65) Prior Publication Data
US 2023/0331887 A1     Oct. 19, 2023

(30) Foreign Application Priority Data

Sep. 29, 2020    (JP) ................................. 2020-163733

(51) Int. Cl.
| | |
|---|---|
| *C08F 220/06* | (2006.01) |
| *B32B 17/10* | (2006.01) |
| *C08F 2/01* | (2006.01) |
| *C08F 8/42* | (2006.01) |
| *C08K 3/22* | (2006.01) |

(52) U.S. Cl.
CPC ...... *C08F 220/06* (2013.01); *B32B 17/10743* (2013.01); *C08F 2/01* (2013.01); *C08F 8/42* (2013.01); *C08K 3/22* (2013.01); *B32B*

*2250/03* (2013.01); *B32B 2250/40* (2013.01); *B32B 2307/412* (2013.01); *C08K 2003/2265* (2013.01); *C08K 2003/2293* (2013.01)

(58) Field of Classification Search
CPC ........ C08F 210/02; C08F 220/06; C08F 8/12; C08F 220/14; C08K 2003/0856; C08K 2003/0862
USPC ....................... 524/440, 562; 525/330.6, 919
See application file for complete search history.

(56) References Cited

U.S. PATENT DOCUMENTS

| | | | | |
|---|---|---|---|---|
| 3,249,570 A | * | 5/1966 | Potts ......................... | C08J 5/18 |
| | | | | 525/383 |
| 2023/0025550 A1 | * | 1/2023 | Shirouchi ......... | B32B 17/10036 |

FOREIGN PATENT DOCUMENTS

| | | |
|---|---|---|
| JP | S58-23850 A | 2/1983 |
| JP | S63-57665 A | 3/1988 |
| JP | 2009518464 A | 5/2009 |
| JP | 2015054411 A | 3/2015 |
| WO | WO-2020241515 A1 | 12/2020 |
| WO | WO-2021124951 A1 | 6/2021 |

OTHER PUBLICATIONS

HXSCO Blog: "What is SUS Material . . . ," 30 pages, retrieved online: https://hxsco.com/blog/what-is-sus-material/, Copyright 2025. (Year: 2025).*
International Search Report issued Dec. 14, 2021 in PCT/JP2021/ 034820, 2 pages.

* cited by examiner

*Primary Examiner* — Fred M Teskin
(74) *Attorney, Agent, or Firm* — Element IP, PLC

(57) ABSTRACT

The present invention relates to an ionomer resin, comprising a (meth)acrylic acid unit (A), a neutralized (meth)acrylic acid unit (B) and an ethylene unit (C), wherein a total content of the unit (A) and the unit (B) is 6 to 10% by mole based on all monomer units constituting the ionomer resin, and the content of a transition metal in the ionomer resin is 0.01 to 100 mg/kg.

10 Claims, No Drawings

IONOMER RESIN, RESIN SHEET, AND LAMINATED GLASS

TECHNICAL FIELD

This patent application claims priority under the Paris Convention based on Japanese Patent Application No. 2020-163733 (filed on Sep. 29, 2020), which is incorporated herein by reference in its entirety.

The present invention relates to: an ionomer resin; a method of producing the same; a resin sheet that includes at least one layer containing the ionomer resin; a laminated glass intermediate film that consists of the resin sheet; and a laminated glass that includes the laminated glass intermediate film.

BACKGROUND ART

Ionomers, which are neutralization products of ethylene-unsaturated carboxylic acid copolymers, are used in intermediate films of laminated glass because of their excellent transparency and adhesion with glass (e.g., Patent Literature 1). In recent years, with the increasing performance requirements for laminated glass, ionomer resins are also demanded, for example, to keep high transparency regardless of the production conditions of laminated glass; to maintain a high elastic modulus and not to cause a reduction in the strength of laminated glass even at a high temperature; to have excellent appearance with less coloring; and to exhibit superior adhesion with glass and to be hardly peelable from glass.

Patent Literature 2 discloses a polymeric sheet which includes at least one layer containing an ionomer or ionomer blend incorporating a partially neutralized $\alpha,\beta$-ethylenically unsaturated carboxylic acid, wherein the ionomer or ionomer blend contains ions of one or more monovalent metals in an amount of about 1% to about 60%, and ions of one or more polyvalent metals in an amount of about 40% to about 99%, based on a total amount of neutralization of the $\alpha,\beta$-ethylenically unsaturated carboxylic acid.

Patent Literature 3 discloses a resin composition containing an ionomer resin and an adhesion promoter, wherein the adhesion promoter is a dialkoxysilane compound.

CITATION LIST

Patent Literature

Patent Literature 1: U.S. Pat. No. 6,432,522 B1
Patent Literature 2: JP 2009-512763 A
Patent Literature 3: WO 2019/027865 A1

SUMMARY OF INVENTION

Technical Problem

When a laminated glass is used outdoors, there are cases where, due to the moisture from rain and the like, peeling occurs between glass and an intermediate film of the laminated glass and the transparency is reduced by whitening, particularly at the edges of the laminated glass. Therefore, there is a demand for an ionomer resin which can form a laminated glass intermediate film that has high transparency and exhibits high adhesion with glass even under high-humidity conditions.

Patent Literature 2 discloses that the ionomer or ionomer blend disclosed therein exhibits synergistically improved glass adhesion. However, according to the studies conducted by the present inventors, it was found that, under high-humidity conditions, the ionomer disclosed in Patent Literature 2 can tend to delaminate from glass and thus have insufficient adhesion to the glass, in addition to a tendency to whiten and have less transparency.

Patent Literature 3 discloses that the resin composition disclosed therein exhibits high adhesion with glass even under high-humidity conditions. However, according to the studies conducted by the present inventors, it was found that the resin composition disclosed in Patent Literature 3 is likely to generate a crosslinked gel during forming process, and needs further improvement to obtain therefrom a resin sheet having a good appearance.

In view of the above, an object of the present invention is to provide: an ionomer resin from which a sheet that not only has high transparency and exhibits high adhesion with a substrate such as glass even under high-humidity conditions but also has a good appearance can be formed; and a method of producing the same.

Solution to Problem

The present inventors intensively studied to solve the above-described problems, and thereby arrived at the present invention. That is, the present invention provides the following preferred embodiments.

[1] An ionomer resin, comprising:
a (meth)acrylic acid unit (A);
a neutralized (meth)acrylic acid unit (B); and
an ethylene unit (C),
wherein
a total content of the unit (A) and the unit (B) is 6 to 10% by mole based on all monomer units constituting the ionomer resin, and
the content of a transition metal in the ionomer resin is 0.01 to 100 mg/kg.

[2] The ionomer resin according to [1], further comprising a (meth)acrylic acid ester unit (D),
wherein a total content of the unit (A), the unit (B), and the unit (D) is 6 to 10% by mole based on all monomer units constituting the ionomer resin.

[3] The ionomer resin according to [1] or [2], wherein the transition metal is at least one metal selected from the group consisting of iron, nickel, manganese, and chromium.

[4] A resin sheet, comprising at least one layer comprising the ionomer resin according to any one of [1] to [3].

[5] A laminated glass intermediate film, consisting of the resin sheet according to [4].

[6] A laminated glass, comprising:
two glass plates; and
the laminated glass intermediate film according to [5], which is arranged between the two glass plates.

[7] A method of producing the ionomer resin according to any one of [1] to [3], the method comprising:
a saponification step of saponifying an ethylene-(meth) acrylic acid ester copolymer with a strong base; and
a demetallization step of demetallizing a saponification product obtained by the saponification step with a strong acid,
wherein the saponification step and/or the demetallization step is/are performed in the presence of a transition metal.

[8] The method according to [7], wherein the demetallization step is performed by intra-liquid addition of the strong acid to a solution of the saponification product.

[9] The method according to [7] or [8], wherein
the saponification step and/or the demetallization step
is/are performed using a reaction apparatus, and
at least a portion of the reaction apparatus is formed of an
alloy comprising nickel and chromium as transition
metals in a total amount of not less than 50% by mass.
[10] The method according to [9], wherein the at least a
portion of the reaction apparatus is at least a portion selected
from the group consisting of a reaction vessel, a stirring
blade, a baffle, and a feed line through which the strong base
and/or the strong acid is/are supplied to the reaction vessel.

Advantageous Effects of Invention

According to the present invention, the following can be
provided: an ionomer resin from which a sheet that not only
has high transparency and exhibits high adhesion with glass
even under high-humidity conditions but also has a good
appearance can be formed; and a method of producing the
same.

DESCRIPTION OF EMBODIMENTS

Embodiments of the present invention will now be
described in detail. It is noted here, however, that the scope
of the present invention is not limited to the embodiments
described below, and various modifications can be made
without departing from the spirit of the present invention.
[Ionomer Resin]
The ionomer resin of the present invention contains: a
(meth)acrylic acid unit (A); a neutralized (meth)acrylic acid
unit (B); and an ethylene unit (C), and the content of a
transition metal in the ionomer resin is 0.01 to 100 mg/kg.
The ionomer resin of the present invention contains a
transition metal, and the content thereof is 0.01 to 100
mg/kg. The present inventors discovered that, when an
ionomer resin contains 0.01 to 100 mg/kg of a transition
metal, surprisingly, the adhesion of the ionomer resin with
glass, particularly the adhesion with glass under high-hu-
midity conditions, is improved while the transparency of the
ionomer resin, particularly the transparency under high-
humidity conditions (e.g., whitening resistance under high-
humidity conditions), is maintained. Accordingly, the iono-
mer resin of the present invention has high transparency and
exhibits high adhesion with glass even under high-humidity
conditions. The reason why the ionomer resin can be pro-
vided with improved transparency and improved adhesion
with glass under high-humidity conditions by controlling the
content of a transition metal in the ionomer resin to be 0.01
to 100 mg/kg is not clear; however, it is considered to be
attributed to the interaction between the transition metal and
the (meth)acrylic acid unit (A) in the ionomer resin, and/or
inhibition of water absorption of the ionomer resin as
compared to an ionomer resin that does not contain any
transition metal.
In addition, the present inventors discovered that, surpris-
ingly, the ionomer resin of the present invention hardly
generates a crosslinked gel despite having high adhesion
with glass (particularly under high-humidity conditions)
and, as a result, is likely to yield a resin sheet having a good
appearance. Normally, a resin in which an adhesion pro-
moter such as a silane coupling agent is incorporated and the
adhesion with glass is thereby improved is likely to generate
a crosslinked gel, and it thus tends to be difficult to obtain
a resin sheet having a good appearance from such a resin;
however, surprisingly, the ionomer resin of the present invention is likely to yield a resin sheet that exhibits high
adhesion with glass and has a good appearance.
Further, the present inventors discovered that the thermal
decomposition resistance of an ionomer resin can also be
improved by controlling the content of a transition metal in
the ionomer resin to be 0.01 to 100 mg/kg. The reason why
the ionomer resin of the present invention has excellent
thermal decomposition resistance is not clear; however, it is
considered to be because dissociation of the (meth)acrylic
acid unit (A) contained in the ionomer resin, which is caused
by heat, is likely to be inhibited by the interaction between
the transition metal and the (meth)acrylic acid unit (A) in the
ionomer resin.
On the other hand, when the content of a transition metal
in the ionomer resin is outside the above-described range,
the transparency (particularly the transparency under high-
humidity conditions), the adhesion with glass (particularly
the adhesion with glass under high-humidity conditions),
and the thermal decomposition resistance of the ionomer
resin tend to be deteriorated. When the content of a transition
metal is less than 0.01 mg/kg, the adhesion with glass under
high-humidity conditions tends to be deteriorated, and peel-
ing from glass is thus likely to occur under high-humidity
conditions; therefore, for example, when a resin sheet
formed of the ionomer resin is used outdoors as an inter-
mediate film of a laminated glass, peeling is likely to occur
between the intermediate film and glass, particularly at the
edges of the laminated glass. Further, when the content of a
transition metal exceeds 100 mg/kg, the transparency of the
ionomer resin, particularly the transparency under high-
humidity conditions, is likely to be reduced; therefore, for
example, when a resin sheet formed of the ionomer resin is
used outdoors as an intermediate film of a laminated glass,
whitening is likely to occur particularly at the edges of the
laminated glass. Moreover, when the content of a transition
metal exceeds 100 mg/kg, the ionomer resin is likely to be
colored and have a high yellowness YI during forming
process.
From the standpoint of improving the transparency, the
adhesion with glass under high-humidity conditions, and the
thermal decomposition resistance, the content of a transition
metal is not less than 0.01 mg/kg, preferably not less than
0.05 mg/kg, more preferably not less than 0.1 mg/kg, still
more preferably not less than 0.2 mg/kg. Further, from the
standpoint of improving the transparency and the thermal
decomposition resistance as well as the standpoint of inhib-
iting coloring of the ionomer resin, the content of a transition
metal is 100 mg/kg or less, preferably 50 mg/kg or less,
more preferably 20 mg/kg or less, still more preferably 10
mg/kg or less, yet still more preferably 5 mg/kg or less. The
content of a transition metal in the ionomer resin can be
adjusted by a method of producing the ionomer resin. The
content of a transition metal in the ionomer resin can be
measured by inductively-coupled plasma (ICP) emission
spectrometry, for example, the method described below in
the section of Examples.
The transition metal contained in the ionomer resin is not
particularly limited, and examples thereof include: first-row
transition metals, such as scandium, titanium, vanadium,
chromium, manganese, iron, cobalt, and nickel; and second-
row transition metals, such as yttrium, zirconium, niobium,
molybdenum, technetium, ruthenium, rhodium, palladium,
and silver. These transition metals may be contained singly,
or in combination of two or more thereof.
In one embodiment of the present invention, from the
standpoint of improving the transparency of the ionomer
resin under high-humidity conditions as well as the thermal decomposition resistance and the adhesion with glass under high-humidity conditions, the transition metal is preferably a first-row transition metal, more preferably at least one metal selected from the group consisting of iron, nickel, manganese, and chromium, still more preferably one or more metals including at least iron.

In the present invention, the state of the transition metal contained in the ionomer resin is not particularly limited. The transition metal may be contained in the ionomer resin in the form of, for example, a transition metal oxide, a transition metal hydroxide, a transition metal halide, or a transition metal salt, or may be contained as a metal ion in the neutralized (meth)acrylic acid unit (B) of the ionomer resin.

The ionomer resin of the present invention contains: a (meth)acrylic acid unit (A); a neutralized (meth)acrylic acid unit (B); and an ethylene unit (C), and a total content of the unit (A) and the unit (B) is 6 to 10% by mole based on all monomer units constituting the ionomer resin.

In the present invention, the term "X unit" means a "structural unit derived from X". For example, "(meth) acrylic acid unit" refers to a structural unit derived from (meth)acrylic acid, "neutralized (meth)acrylic acid unit" refers to a structural unit derived from neutralized (meth) acrylic acid, and "ethylene unit" refers to a structural unit derived from ethylene. Further, the term "(meth)acrylic acid" used herein refers to methacrylic acid or acrylic acid.

When the above-described total content is 6 to 10% by mole based on all monomer units constituting the ionomer resin, the transparency and the elastic modulus (e.g., the elastic modulus at 50° C.) of the ionomer resin are likely to be improved. On the other hand, when the total content exceeds the above-described upper limit value, the ionomer resin is unlikely to exhibit a high elastic modulus (e.g., a high elastic modulus at 50° C.). Further, if the total content is less than the above-described lower limit value, the ionomer resin tends to easily whiten due to excessively high crystallinity; therefore, for example, when the ionomer resin is treated at a high temperature and then slowly cooled in the production of a laminated glass, the transparency in a state where the ionomer resin is slowly cooled and its crystallization is facilitated (transparency after slow cooling) is likely to be reduced.

From the standpoint of improving the transparency (particularly the transparency after slow cooling) of the ionomer resin and the adhesion with glass, the above-described total content is not less than 6% by mole, preferably not less than 6.5% by mole, more preferably not less than 7.0% by mole, still more preferably not less than 7.5% by mole. Further, from the standpoint of improving the elastic modulus and the formability of the ionomer resin, the total content is 10% by mole or less, preferably 9.9% by mole or less, more preferably 9.5% by mole or less.

The total content of the unit (A) and the unit (B) can be adjusted by a method of producing the ionomer resin. More specifically, in the case of using an ethylene-(meth)acrylic acid ester copolymer as a raw material and producing the ionomer resin by a method that includes performing the saponification reaction step and the demetallization reaction step for this copolymer, the total content of the unit (A) and the unit (B) can be adjusted by modifying the reactivity (conversion rate) of the respective reactions in which the (meth)acrylic acid ester unit in the ethylene-(meth)acrylic acid ester copolymer is converted into the (meth)acrylic acid unit (A) and the neutralized (meth)acrylic acid unit (B) by the saponification reaction and the demetallization reaction, respectively. Alternatively, in the case of using ethylene and (meth)acrylic acid as raw materials and producing the ionomer resin by polymerization of these raw materials as disclosed in U.S. Pat. No. 8,399,096 B, the total content of the unit (A) and the unit (B) can be adjusted by modifying the ratio of ethylene and (meth)acrylic acid to be copolymerized.

Examples of a monomer constituting the (meth)acrylic acid unit (A) include acrylic acid and methacrylic acid and, from the standpoint of the heat resistance and the adhesion with a substrate such as glass, the monomer is preferably methacrylic acid. Such a (meth)acrylic acid unit may be one type, or a combination of two or more types.

The content of the (meth)acrylic acid unit (A) in the ionomer resin is not particularly limited as long as the total content of the unit (A) and the unit (B) is in a range of 6 to 10% by mole based on all monomer units constituting the ionomer resin. In one embodiment of the present invention, the content of the (meth)acrylic acid unit (A) in the ionomer resin is, based on all monomer units constituting the ionomer resin, preferably not less than 4.5% by mole, more preferably not less than 5.0% by mole, still more preferably not less than 5.5% by mole, particularly preferably not less than 5.8% by mole, but preferably 9.0% by mole or less, more preferably 8.5% by mole or less, still more preferably 8.0% by mole or less, particularly preferably 7.5% by mole or less. When the content of the unit (A) is equal to or more than the above-described lower limit value, the transparency of the ionomer resin and the adhesion of the ionomer resin with a substrate such as glass are likely to be improved. Further, when the content of the unit (A) is equal to or less than the above-described upper limit value, the formability is likely to be improved.

The term "neutralized (meth)acrylic acid" used herein refers to (meth)acrylic acid in which a hydrogen ion is substituted with a metal ion. The neutralized (meth)acrylic acid unit (B) is preferably a neutralization product of the (meth)acrylic acid unit (A). Examples of the metal ion include: ions of alkali metals, such as lithium, sodium, and potassium; ions of alkaline earth metals, such as magnesium and calcium; and ions of Group 12 to 13 non-transition metals, such as zinc and aluminum; and transition metal ions. One example of the transition metal ions is an ion of the transition metal that may be contained in the ionomer resin. These metal ions may be one type, or a combination of two or more types.

The content of the neutralized (meth)acrylic acid unit (B) in the ionomer resin is not particularly limited as long as the total content of the unit (A) and the unit (B) is in a range of 6 to 10% by mole based on all monomer units constituting the ionomer resin. In one embodiment of the present invention, the content of the neutralized (meth)acrylic acid unit (B) is, based on all monomer units constituting the ionomer resin, preferably not less than 0.65% by mole, more preferably not less than 1.0% by mole, still more preferably not less than 1.5% by mole, particularly preferably not less than 1.7% by mole, but preferably 3.0% by mole or less, more preferably 2.7% by mole or less, still more preferably 2.6% by mole or less, particularly preferably 2.5% by mole or less. When the content of the unit (B) is equal to or more than the above-described lower limit value, the transparency and the elastic modulus are likely to be improved, while when the content of the unit (B) is equal to or less than the above-described upper limit value, an increase in the melt viscosity during forming process is likely to be inhibited.

In the case of using an ethylene-(meth)acrylic acid ester copolymer as a raw material and producing the ionomer resin by a method that includes performing the saponification reaction step and the demetallization reaction step for this copolymer, the content of the unit (A) and that of the unit (B) can each be adjusted by modifying the reactivity of the respective reactions in which the (meth)acrylic acid ester unit in the ethylene-(meth)acrylic acid ester copolymer is converted into the (meth)acrylic acid unit (A) and the neutralized (meth)acrylic acid unit (B) by the saponification reaction and the demetallization reaction, respectively.

<Ethylene Unit (C)>

From the standpoint of improving the impact resistance of the ionomer resin, the content of the ethylene unit (C) is, based on all monomer units constituting the ionomer resin, preferably not less than 80% by mole, more preferably not less than 85% by mole, still more preferably not less than 88% by mole. Further, from the standpoint of improving the transparency (particularly the transparency after slow cooling) of the ionomer resin, the content of the ethylene unit (C) is, based on all monomer units constituting the ionomer resin, preferably 94% by mole or less, more preferably 91% by mole or less. When the content of the ethylene unit (C) is equal to or more than the above-described lower limit value, the mechanical strength and the formability are likely to be improved, while when the content of the ethylene unit (C) is equal to or less than the above-described upper limit value, the ionomer resin is made unlikely to crystallize, so that the transparency (particularly the transparency after slow cooling) is likely to be improved.

From the standpoint of obtaining higher transparency, the ionomer resin of the present invention preferably further contains a (meth)acrylic acid ester unit (D) in addition to the (meth)acrylic acid unit (A), the neutralized (meth)acrylic acid unit (B), and the ethylene unit (C).

When the ionomer resin contains a (meth)acrylic acid ester unit (D), from the standpoint of improving the transparency (particularly the transparency after slow cooling), a total content of the unit (A), the unit (B), and the unit (D) is preferably 6 to 10% by mole based on all monomer units constituting the ionomer resin. In other words, in one preferred embodiment of the present invention, the ionomer resin of the present invention contains: a (meth)acrylic acid unit (A); a neutralized (meth)acrylic acid unit (B); an ethylene unit (C); and a (meth)acrylic acid ester unit (D), and a total content of the unit (A), the unit (B), and the unit (D) is 6 to 10% by mole based on all monomer units constituting the ionomer resin. In cases where the ionomer resin contains a (meth)acrylic acid ester unit (D), when the total content of the unit (A), the unit (B), and the unit (D) is equal to or less than the above-described upper limit value, the ionomer resin is likely to exhibit a high elastic modulus, while when the total content is equal to or more than the above-described lower limit value, the transparency, particularly the transparency after slow cooling, of the ionomer resin is likely to be improved.

When the ionomer resin contains a (meth)acrylic acid ester unit (D), from the standpoint of improving the transparency (particularly the transparency after slow cooling) and the adhesion with a substrate such as glass, the above-described total content of the unit (A), the unit (B), and the unit (D) is not less than 6% by mole, preferably not less than 6.5% by mole, more preferably not less than 7.0% by mole, still more preferably not less than 7.5% by mole. Further, from the standpoint of improving the elastic modulus and the formability of the ionomer resin, the total content of the unit (A), the unit (B), and the unit (D) is 10% by mole or less, preferably 9.9% by mole or less, more preferably 9.5% by mole or less.

The total content of the unit (A), the unit (B), and the unit (D) can be adjusted by modifying the raw materials of the ionomer resin. More specifically, in the case of using an ethylene-(meth)acrylic acid ester copolymer as a raw material and producing the ionomer resin by a method that includes performing the saponification reaction step and the demetallization reaction step for this copolymer, the total content of the unit (A), the unit (B), and the unit (D) can be adjusted by changing the modification amount of the (meth) acrylic acid ester of the ethylene-(meth)acrylic acid ester copolymer used as a raw material of the ionomer resin. Alternatively, in the case of using ethylene and (meth)acrylic acid as raw materials and producing the ionomer resin by polymerization of these raw materials as disclosed in U.S. Pat. No. 8,399,096 B, the total content of the unit (A), the unit (B), and the unit (D) can be adjusted by modifying the ratio of ethylene and (meth)acrylic acid that are copolymerized.

Examples of a monomer constituting the (meth)acrylic acid ester unit (D) include methyl (meth)acrylate, ethyl (meth)acrylate, n-propyl (meth)acrylate, isopropyl (meth) acrylate, n-butyl (meth)acrylate, isobutyl (meth)acrylate, sec-butyl (meth)acrylate, t-butyl (meth)acrylate, amyl (meth)acrylate, isoamyl (meth)acrylate, n-hexyl (meth)acrylate, cyclohexyl (meth)acrylate, 2-ethylhexyl (meth)acrylate, pentadecyl (meth)acrylate, dodecyl (meth)acrylate, isobornyl (meth)acrylate, phenyl (meth)acrylate, benzyl (meth)acrylate, phenoxyethyl (meth)acrylate, 2-hydroxyethyl (meth)acrylate, 2-methoxyethyl (meth)acrylate, glycidyl (meth)acrylate, and allyl (meth)acrylate.

Thereamong, from the standpoint of the transparency or the heat resistance, methyl (meth)acrylate, ethyl (meth) acrylate, n-propyl (meth)acrylate, isopropyl (meth)acrylate, n-butyl (meth)acrylate, isobutyl (meth)acrylate, sec-butyl (meth)acrylate, and t-butyl (meth)acrylate are preferred monomers; methyl (meth)acrylate, ethyl (meth)acrylate, n-propyl (meth)acrylate, isopropyl (meth)acrylate, n-butyl (meth)acrylate, and isobutyl (meth)acrylate are more preferred monomers; methyl (meth)acrylate, n-butyl (meth) acrylate, and isobutyl (meth)acrylate are still more preferred monomers; and methyl (meth)acrylate is a particularly preferred monomer. These (meth)acrylic acid esters may be used singly, or in combination of two or more thereof.

When the ionomer resin contains a (meth)acrylic acid ester unit (D), the content of the (meth)acrylic acid ester unit (D) in the ionomer resin is not particularly limited. In one embodiment of the present invention, the content of the (meth)acrylic acid ester unit (D) in the ionomer resin is, based on all monomer units constituting the ionomer resin, preferably not less than 0.01% by mole, more preferably not less than 0.05% by mole, particularly preferably not less than 0.08% by mole, but preferably 1.0% by mole or less, more preferably 0.7% by mole or less, still more preferably 0.5% by mole or less. When the content of the unit (D) is equal to or more than the above-described lower limit value and equal to or less than the above-described upper limit value, the transparency of the ionomer resin is likely to be improved.

In the case of using an ethylene-(meth)acrylic acid ester copolymer as a raw material and producing the ionomer resin by a method that includes performing the saponification reaction step and the demetallization reaction step for this copolymer, when the ionomer resin contains a (meth) acrylic acid ester unit (D), the content of this unit (D) can be adjusted by modifying the reactivity of the saponification reaction in which the (meth)acrylic acid ester unit (D) in the ethylene-(meth)acrylic acid ester copolymer is converted into the (meth)acrylic acid unit (A).

The ionomer resin of the present invention may also contain other monomer units in addition to the (meth)acrylic acid unit (A), the neutralized (meth)acrylic acid unit (B), the ethylene unit (C), and the optionally contained (meth)acrylic acid ester unit (D). Examples of the other monomer units include a carboxylic acid unit (A1) other than the (meth) acrylic acid unit (A), and a neutralized carboxylic acid unit (B1) other than the neutralized (meth)acrylic acid unit (B).

Examples of a monomer constituting the carboxylic acid unit (A1) include itaconic acid, maleic anhydride, monomethyl maleate, and monoethyl maleate, and the monomer is preferably monomethyl maleate or monoethyl maleate. Examples of a monomer constituting the neutralized carboxylic acid unit (B1) include neutralization products of the carboxylic acid unit (A1). It is noted here that a "neutralized carboxylic acid" refers to a carboxylic acid in which a hydrogen ion is substituted with a metal ion. Examples of the metal ion include the same metal ions as those exemplified above for the neutralized (meth)acrylic acid unit (B), and such metal ions may be one type, or a combination of two or more types.

The above-described other monomer units may be used one type, or a combination of two or more types.

When the ionomer resin contains the above-described other monomer units, a total content thereof, for example, a total content of (A1) and (B1), may be selected as appropriate within a range that does not impair the effects of the present invention, and it is, for example, preferably 5% by mole or less, more preferably 3% by mole or less, still more preferably 1% by mole or less, but preferably not less than 0.01% by mole, more preferably not less than 0.1% by mole, based on all monomer units constituting the ionomer resin.

The content of each of the (meth)acrylic acid unit (A), the neutralized (meth)acrylic acid unit (B), and the ethylene unit (C), as well as the optionally contained (meth)acrylic acid ester unit (D) and other monomer units (e.g., the unit (A1) and the unit (B1)) in the ionomer resin of the present invention can be determined by first identifying the monomer units in the ionomer resin by pyrolysis gas chromatography, and subsequently performing nuclear magnetic resonance spectroscopy (NMR) and elemental analysis. More specifically, the content of each unit can be determined by the method described below in the section of Examples. Alternatively, it can be determined by a combination of the above-described analysis method and an IR and/or Raman analysis. Prior to these analyses, components other than the ionomer resin are preferably removed by a reprecipitation method or a Soxhlet extraction method.

In one embodiment of the present invention, the degree of branching per 1,000 carbon atoms of the ionomer resin of the present invention is not particularly limited; however, it is preferably 5 to 30, more preferably 6 to 20. For example, in the case of using an ethylene-(meth)acrylic acid ester copolymer as a raw material and producing the ionomer resin by a method that includes performing the saponification reaction step and the demetallization reaction step for this copolymer, the degree of branching can be adjusted by modifying the polymerization temperature at the time of synthesizing the ethylene-(meth)acrylic acid ester copolymer used as a raw material. The degree of branching per 1,000 carbon atoms can be measured by a broadband dipolar decoupling/magic angle spinning (DD/MAS) method using solid-state NMR.

In one embodiment of the present invention, from the standpoint of the heat resistance and the thermal decomposition resistance, the melting point of the ionomer resin of the present invention is preferably 50° C. or higher, more preferably 60° C. or higher, still more preferably 80° C. or higher. Further, from the standpoint of allowing the ionomer resin to exhibit an adhesive strength with glass at the time of producing a laminated glass, the melting point of the ionomer resin of the present invention is preferably 200° C. or lower, more preferably 180° C. or lower, still more preferably 150° C. or lower. The melting point can be determined based on JIS K7121:2012. Specifically, a measurement is performed using a differential scanning calorimeter (DSC) at a cooling rate of −10° C./min and a heating rate of 10° C./min, and the melting point can be determined from the peak-top temperature of a melting peak in the second heating.

In one embodiment of the present invention, the heat of fusion of the ionomer resin of the present invention is preferably 0 J/g or higher and 25 J/g or lower. The heat of fusion can be determined based on JIS K7122:2012. Specifically, a measurement is performed using a differential scanning calorimeter (DSC) at a cooling rate of −10° C./min and a heating rate of 10° C./min, and the heat of fusion can be calculated from the area of a melting peak in the second heating.

In one embodiment of the present invention, the melt flow rate (MFR) of the ionomer resin of the present invention, which is measured in accordance with JIS K7210 at 190° C. and 2.16-kg load, is preferably 0.1 g/10 min or higher, more preferably 0.3 g/10 min or higher, still more preferably 0.7 g/10 min or higher, yet still more preferably 1.0 g/10 min or higher, particularly preferably 1.5 g/10 min or higher, but preferably 50 g/10 min or lower, more preferably 30 g/10 min or lower, particularly preferably 10 g/10 min or lower. When the MFR of the ionomer resin is equal to or higher than the above-described lower limit value and equal to or lower than the above-described upper limit value, the ionomer resin can be easily formed while inhibiting deterioration caused by heat, so that a resin sheet having excellent penetration resistance is likely to be obtained.

The melting point, the heat of fusion, and the MFR of the ionomer resin can be adjusted by modifying the molecular weight of the ionomer resin as well as the contents of the (meth)acrylic acid unit (A), the neutralized (meth)acrylic acid unit (B), the ethylene unit (C), and the optionally contained (meth)acrylic acid ester unit (D) in the ionomer resin.

In one embodiment of the present invention, from the standpoint of obtaining a good self-supportability (i.e. high elastic modulus), particularly a good self-supportability in a high-temperature environment (high elastic modulus in a high-temperature environment), the storage elastic modulus (E') at 50° C. of the ionomer resin of the present invention, which is determined by dynamic viscoelasticity measurement, is preferably 20 MPa or higher, more preferably 30 MPa or higher, still more preferably 40 MPa or higher, particularly preferably 50 MPa or higher. An upper limit value of the storage elastic modulus (E') is not particularly limited, and may be 1,000 MPa. The storage elastic modulus can be adjusted by modifying the molecular weight of the ionomer resin as well as the contents of the (meth)acrylic acid unit (A), the neutralized (meth)acrylic acid unit (B), the ethylene unit (C), and the optionally contained (meth)acrylic acid ester unit (D). The storage elastic modulus (E') at 50° C. of the ionomer resin can be determined by dynamic viscoelasticity measurement.

The ionomer resin of the present invention contains a transition metal in an amount of 0.01 to 100 mg/kg as described above and, therefore, has a high thermal decomposition resistance. In a preferred embodiment of the present invention, the 1% weight reduction temperature (Td1) of the ionomer resin of the present invention when heated at 10° C./min in a nitrogen atmosphere is preferably 330° C. or higher, more preferably 350° C. or higher, still more preferably 360° C. or higher, particularly preferably 370° C. or higher, but usually 450° C. or lower. When the 1% weight reduction temperature of the ionomer resin is equal to or higher than the above-described lower limit value, foaming and/or thermal decomposition of the ionomer resin during melt forming is/are likely to be reduced, so that an intermediate film having no defect, such as a black foreign matter generated by foaming and/or thermal decomposition of the resin, is likely to be obtained. It is noted here that the term "1% weight reduction temperature" used herein refers to a temperature at which the weight reduction rate is 1% based on the weight measured at 200° C. The 1% weight reduction temperature can be measured in accordance with JIS K7120: 1987 by, for example, the method described below in the section of Examples.

The ionomer resin of the present invention has high transparency and, in a preferred embodiment of the present invention, the haze of the ionomer resin of the present invention at a sheet thickness of 0.8 mm is preferably 2.0% or less, more preferably 1.5% or less, still more preferably 1.0% or less. The lower the haze, the higher is the transparency of the ionomer resin; therefore, a lower limit value of the haze is not particularly limited and may be, for example, 0.01%. The haze of the ionomer resin is measured using a haze meter in accordance with JIS K7136:2000.

In the ionomer resin of the present invention, the content of the transition metal is 0.01 to 100 mg/kg; therefore, the ionomer resin has high transparency even under high-humidity conditions. The transparency of the ionomer resin under high-humidity conditions can be evaluated using the haze of the ionomer resin in a water-absorbed state (haze after water absorption). In a preferred embodiment of the present invention, the haze of the ionomer resin of the present invention in a water-absorbed state (haze after water absorption) at a sheet thickness of 0.8 mm is preferably 9.0% or less, more preferably 5.0% or less, still more preferably 3.0% or less. The lower the haze after water absorption, the higher the transparency of the ionomer resin in a water-absorbed state is; therefore, a lower limit value of the haze after water absorption is not particularly limited and may be, for example, 0.01%. The haze after water absorption can be measured using a haze meter in accordance with JIS K7136: 2000 by, for example, the method described below in the section of Examples, in which the ionomer resin that is maintained in an immersed state in 23° C. ion-exchanged water for 300 hours and subsequently taken out of the ion-exchanged water, followed by removal of water adhering to the surface by wiping, is used as a test piece.

In the ionomer resin of the present invention, a total content of the (meth)acrylic acid unit (A) and the neutralized (meth)acrylic acid unit (B) is 6% by mole or more; therefore, the ionomer resin is unlikely to crystallize, and has high transparency even when cooled slowly. In a preferred embodiment of the present invention, the haze of the ionomer resin of the present invention in a state where crystallization of the resin is facilitated by slow cooling (haze after slow cooling) is preferably 5.0% or less, more preferably 4.5% or less, still more preferably 4.0% or less, yet still more preferably 3.0% or less, particularly preferably 2.5% or less. The lower this haze, the higher is the transparency of the ionomer resin; therefore, a lower limit value of the haze is not particularly limited and may be, for example, 0.01%. The haze after slow cooling can be determined by arranging the ionomer resin having a sheet thickness of 0.8 mm between two glass plates to prepare a laminated glass, heating this laminated glass to 140° C., slowly cooling the laminated glass from 140° C. to 23° C. at a rate of 0.1° C./min, and then measuring the haze using a haze meter in accordance with JIS K7136:2000.

In the ionomer resin of the present invention, the content of the transition metal is 100 mg/kg or less; therefore, the ionomer resin has a low colorability and is thus unlikely to be colored even during forming process. From the standpoint of making coloring less likely to occur, the yellowness (YI) of the ionomer resin of the present invention at a sheet thickness of 0.8 mm is preferably 3.0 or less, more preferably 2.0 or less, still more preferably 1.5 or less, particularly preferably 1.0 or less. The lower the yellowness (YI), the less is the coloring of the ionomer resin; therefore, a lower limit value of the yellowness (YI) is not particularly limited and may be, for example, 0. The yellowness (YI) can be measured using a colorimetric color-difference meter in accordance with JIS Z8722 by, for example, the method described below in the section of Examples.

The adhesion of the ionomer resin of the present invention with glass can be evaluated using the peeling energy between glass and the ionomer resin, which is measured by a peeling test. The peeling energy between glass and the ionomer resin, which is measured in a standard condition (23° C., 50% RH), is preferably not less than 2 kJ/m², more preferably not less than 2.5 kJ/m², still more preferably not less than 3 kJ/m², particularly preferably not less than 3.5 kJ/m². Further, the adhesion of the ionomer resin with glass under high-humidity conditions can be evaluated using the peeling energy between glass and the ionomer resin, which is measured by a peeling test performed in a wet condition. The peeling energy between glass and the ionomer resin, which is measured in a wet condition, is preferably not less than 0.05 kJ/m², more preferably not less than 0.1 kJ/m², still more preferably not less than 0.15 kJ/m², particularly preferably not less than 0.2 kJ/m². An upper limit of the peeling energy in the standard condition and that of the peeling energy under high-humidity conditions are not particularly limited, and may each be 10 kJ/m² or less. The peeling test can be performed in accordance with, for example, the method disclosed in WO 2019/027865 A as "Peel Adhesion Measurement". The peeling energy in the standard condition and that in wet condition can be measured by, for example, the method described below in the section of Examples.

The ionomer resin of the present invention can be produced by, for example, a method which uses an ethylene-(meth)acrylic acid ester copolymer (X) as a raw material, and comprises:

the step (saponification step) of saponifying the ethylene-(meth)acrylic acid ester copolymer (X) with a strong base; and the step (demetallization step) of demetallizing a saponification product obtained by the saponification step with a strong acid, in which the saponification step and/or the demetallization step is/are performed in the presence of a transition metal (this method is hereinafter also referred to as "production method (I)").

In the production method (I), a part or the entirety of the (meth)acrylic acid ester unit contained in the ethylene-(meth)acrylic acid ester copolymer (X) is converted into a (meth)acrylic acid unit and a neutralized (meth)acrylic acid unit, whereby an ionomer resin containing a (meth)acrylic acid unit (A), a neutralized (meth)acrylic acid unit (B), an ethylene unit (C), and optionally a (meth)acrylic acid ester unit (D) is obtained.

The production method (I) may be a method of converting a part or the entirety of a (meth)acrylic acid ester unit contained in an ethylene-(meth)acrylic acid ester copolymer into a (meth)acrylic acid unit and a neutralized (meth)acrylic acid unit by the above-described saponification step and demetallization step (this method is hereinafter also referred to as "method (I)"), or a method of converting a part or the entirety of a (meth)acrylic acid ester unit contained in an ethylene-(meth)acrylic acid ester copolymer into a (meth) acrylic acid unit and a neutralized (meth)acrylic acid unit by a method that further includes, after the above-described saponification step and demetallization step, the neutralization step of neutralizing the resulting demetallization product (this method is hereinafter also referred to as "method (2)").

In the above-described method (1), specifically, an ethylene-(meth)acrylic acid ester copolymer is saponified with a strong base to convert a part or the entirety of its (meth) acrylic acid ester unit into a neutralized (meth)acrylic acid unit and thereby obtain an ethylene-(meth)acrylic acid ester-neutralized (meth)acrylic acid copolymer or an ethylene-neutralized (meth)acrylic acid copolymer as a saponification product, and the neutralized (meth)acrylic acid unit in the thus obtained saponification product is subsequently partially demetallized with a strong acid and thereby converted into a (meth)acrylic acid unit, as a result of which an ionomer resin containing a (meth)acrylic acid unit (A), a neutralized (meth)acrylic acid unit (B), an ethylene unit (C), and optionally a (meth)acrylic acid ester unit (D) is obtained.

In the above-described method (2), specifically, the neutralized (meth)acrylic acid unit in the saponification product obtained by saponification of an ethylene-(meth)acrylic acid ester copolymer with a strong base in the method (1) is entirely demetallized with a strong acid and thereby converted into a (meth)acrylic acid unit to obtain an ethylene-(meth)acrylic acid copolymer, and the (meth)acrylic acid unit in the thus obtained demetallization product is partially neutralized with a metal ion and thereby converted into a neutralized (meth)acrylic acid unit, as a result of which an ionomer resin containing a (meth)acrylic acid unit (A), a neutralized (meth)acrylic acid unit (B), an ethylene unit (C), and optionally a (meth)acrylic acid ester unit (D) is obtained.

Among the method (1) and the method (2), from the standpoint of improving the production efficiency of the ionomer resin by reducing the number of reactions, it is preferred to produce the ionomer resin by the method (1).

In the above-described production method (I) which uses an ethylene-(meth)acrylic acid ester copolymer (X) as a raw material and comprises the saponification step and the demetallization step, by performing the saponification step and/or the demetallization step in the presence of a transition metal, an ionomer resin containing the transition metal can be obtained.

In the present invention, the phrase "performing the saponification step and/or the demetallization step in the presence of a transition metal" means to perform a saponification reaction in the saponification step and/or a demetallization reaction in the demetallization step in a state where a transition metal exists in the reaction system. The transition metal existing in the reaction system may be a single transition metal, or a combination of two or more transition metals. A method for ensuring that the transition metal exists in the reaction system of the saponification reaction and/or the demetallization reaction is not particularly limited and may be, for example, any of the followings: a method of using a reaction apparatus containing the transition metal; a method of adding a member or the like containing the transition metal to the reaction system; and a method of adding oxide, hydroxide, halide, salt, or the like of the transition metal to the reaction system in the state of a powder and/or a powder dispersed or dissolved in a solvent.

The transition metal existing in the reaction system is corroded by the strong base used for the saponification reaction and/or the strong acid used for the demetallization reaction, as a result of which the transition metal is incorporated into the resulting ionomer resin. For example, when the transition metal existing in the reaction system is corroded, the transition metal ion ionized by the corrosion and eluted into the reaction system substitutes a metal ion in the neutralized (meth)acrylic acid unit (B) or a hydrogen ion of (meth)acrylic acid in the (meth)acrylic acid unit (A), whereby the transition metal can be incorporated into the resulting ionomer resin as the metal ion in the neutralized (meth)acrylic acid unit (B). Further, the transition metal ion eluted into the reaction system reacts with an oxygen ion and/or a halogen ion that may be exist in the reaction system, whereby the transition metal can be incorporated into the resulting ionomer resin as an oxide and/or a halide.

Examples of the transition metal existing in the reaction system include the above-exemplified transition metals that may be contained in the ionomer resin. The transition metal existing in the reaction system may be, for example, a pure metal consisting of a single metal element, or an alloy containing at least one transition metal. The state of the transition metal is not particularly limited, and the transition metal may be in the state of, for example, a metal ion, an oxide, a hydroxide, a halide, or a metal salt.

In one embodiment of the present invention, from the standpoint of improving the adhesion with glass under high-humidity conditions, the transition metal existing in the reaction system is preferably an alloy containing at least one transition metal, more preferably an alloy containing at least one metal selected from the group consisting of iron, nickel, manganese, and chromium, still more preferably an alloy containing two or more metals selected from the group consisting of iron, nickel, manganese, and chromium.

In one embodiment of the present invention, from the standpoint of improving the alkali corrosion resistance against the strong base used in the saponification step and the acid corrosion resistance against the strong acid used in the demetallization step and making it easy to adjust the content of the transition metal in the ionomer resin to be 100 ppm or less, the above-described alloy containing at least one transition metal is preferably an austenitic stainless steel such as SUS304, SUS316, SUS316L, SUS312L, SUS310S, SUS836L, or SUS890L; or a nickel-based alloy such as HASTELLOY B2, HASTELLOY B3, HASTELLOY B4, HASTELLOY C4, HASTELLOY C2000, HASTELLOY C22, HASTELLOY C276, INCONEL X750, INCONEL 625, INCONEL 600, INCONEL 601, INCONEL 625, INCONEL 718, or INCOLOY 825.

In one embodiment of the present invention, from the standpoint of improving the alkali corrosion resistance against the strong base used in the saponification step and the acid corrosion resistance against the strong acid used in the demetallization step and making it easy to adjust the content of the transition metal in the ionomer resin to be 100 ppm or less, the above-described alloy is preferably an alloy that contains nickel and chromium in a total of not less than 50% by mass. The total content of nickel and chromium may be more preferably not less than 60% by mass, still more preferably not less than 70% by mass. Further, from the standpoint of the durability of the alloy, the total content of nickel and chromium may be preferably 98% by mass or less, more preferably 95% by mass or less, still more preferably 90% by mass or less.

In one embodiment of the present invention, it is preferred that the saponification step and/or the demetallization step is performed in a reaction apparatus, and that at least a portion of the reaction apparatus contains at least one transition metal. In this manner, by performing the saponification step and/or the demetallization step in a reaction apparatus at least a portion of which contains at least one transition metal, the saponification step and/or the demetallization step can be performed in the presence of a transition metal.

At least a portion of the reaction apparatus containing at least one transition metal is preferably formed of an alloy containing at least one transition metal, and examples of the alloy containing at least one transition metal include the above-exemplified alloys, including preferred embodiments. Thereamong, from the standpoint of improving the alkali corrosion resistance against the strong base used in the saponification step and the acid corrosion resistance against the strong acid used in the demetallization step and making it easy to adjust the content of the transition metal in the ionomer resin to be 100 ppm or less, the alloy is preferably an alloy that contains nickel and chromium in a total of not less than 50% by mass.

The above-described at least a portion of the reaction apparatus is not particularly limited as long as it is a portion in the reaction apparatus, with which the strong base used for the saponification reaction and/or the strong acid used for the demetallization reaction comes into contact and where corrosion of the transition metal can proceed. For example, the at least a portion of the reaction apparatus may be a portion which can come into contact with a liquid containing the strong base and/or the strong acid, or may be a portion that can come into contact with a gas containing the strong base and/or the strong acid.

In one embodiment of the present invention, the at least a portion of the reaction apparatus may be a portion of an element that can constitute the reaction apparatus, and it is, for example, at least a portion of a reaction vessel, a stirring blade, a baffle, a feed line through which the strong base and/or the strong acid is supplied into a reaction vessel, or the like. The at least a portion of the reaction apparatus may be any one of, or a combination of two or more of the above-exemplified portions. It is noted here that the feed line through which the strong base and/or the strong acid is supplied into a reaction vessel includes a piping, an addition nozzle, a valve, and the like that can constitute the feed line.

In one embodiment of the present invention, the at least a portion of the reaction apparatus is preferably at least a portion of a reaction vessel (e.g., a bottom portion or a side portion of a reaction vessel), more preferably the entirety of a reaction vessel.

In one embodiment of the present invention, in the above-described production method (I) of producing an ionomer resin using an ethylene-(meth)acrylic acid ester copolymer (X) as a raw material, both of the saponification step and the demetallization step may be performed in the presence of a transition metal, or only one of these steps may be performed in the presence of a transition metal.

Examples of a monomer constituting the (meth)acrylic acid ester unit of the ethylene-(meth)acrylic acid ester copolymer (X) include methyl (meth)acrylate, ethyl (meth)

acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, amyl (meth)acrylate, isoamyl (meth)acrylate, n-hexyl (meth)acrylate, cyclohexyl (meth)acrylate, 2-ethylhexyl (meth)acrylate, pentadecyl (meth)acrylate, dodecyl (meth)acrylate, isobornyl (meth) acrylate, phenyl (meth)acrylate, benzyl (meth)acrylate, phenoxyethyl (meth)acrylate, 2-hydroxyethyl (meth)acrylate, 2-methoxyethyl (meth)acrylate, glycidyl (meth)acrylate, and allyl (meth)acrylate. Thereamong, methyl (meth)acrylate, ethyl (meth)acrylate, n-propyl (meth)acrylate, isopropyl (meth)acrylate, n-butyl (meth)acrylate, isobutyl (meth) acrylate, sec-butyl (meth)acrylate, and t-butyl (meth) acrylate are preferred monomers; methyl (meth)acrylate, ethyl (meth)acrylate, n-propyl (meth)acrylate, isopropyl (meth)acrylate, n-butyl (meth)acrylate, and isobutyl (meth) acrylate are more preferred monomers; methyl (meth)acrylate, n-butyl (meth)acrylate, and isobutyl (meth)acrylate are still more preferred monomers; and methyl (meth)acrylate is a particularly preferred monomer. These (meth)acrylic acid esters may be used singly, or in combination of two or more thereof.

Specific examples of the ethylene-(meth)acrylic acid ester copolymer (X) include ethylene-methyl acrylate copolymers, ethylene-methyl methacrylate copolymers, ethylene-ethyl acrylate copolymers, ethylene-ethyl methacrylate copolymers, ethylene-n-propyl acrylate copolymers, ethylene-n-propyl methacrylate copolymers, ethylene-isopropyl acrylate copolymers, ethylene-isopropyl methacrylate copolymers, ethylene-n-butyl acrylate copolymers, ethylene-n-butyl methacrylate copolymers, ethylene-sec-butyl acrylate copolymers, and ethylene-sec-butyl methacrylate copolymers.

As these copolymers, commercially available products may be used, or copolymers synthesized by the high-temperature high-pressure radical polymerization method disclosed in US 2013/0274424, JP 2006-233059 A or JP 2007-84743 A may be used. Examples of the commercially available products include "ACRYFT" (registered trademark) WK307 manufactured by Sumitomo Chemical Co., Ltd., and "REXPEARL" (registered trademark) A4250 manufactured by Japan Polyethylene Corporation.

The content of the (meth)acrylic acid ester unit in the ethylene-(meth)acrylic acid ester copolymer (X) is preferably not less than 6% by mole, more preferably not less than 6.5% by mole, still more preferably not less than 7% by mole, particularly preferably not less than 7.5% by mole, but preferably 10% by mole or less, more preferably 9.9% by mole or less, still more preferably 9.5% by mole or less. The content of the (meth)acrylic acid ester unit in the copolymer (X) corresponds to a total content of the (meth)acrylic acid unit (A), the neutralized (meth)acrylic acid unit (B), and the optionally contained (meth)acrylic acid ester unit (D) in the resulting ionomer resin; therefore, when the content of the (meth)acrylic acid ester unit in the copolymer (X) is equal to or more than the above-described lower limit value, the transparency, particularly the transparency after slow cooling, of the resulting ionomer resin is likely to be improved, while when this content is equal to or less than the above-described upper limit value, the elastic modulus of the resulting ionomer resin is likely to be improved.

The content of the (meth)acrylic acid ester unit in the copolymer (X) can be adjusted by modifying the copolymerization ratio of ethylene and (meth)acrylic acid ester. It is noted here that this content can be determined by pyrolysis gas chromatography, nuclear magnetic resonance spectroscopy (NMR), and elemental analysis in the same manner as the content of each of the (meth)acrylic acid unit (A), the neutralized (meth)acrylic acid unit (B), and the ethylene unit (C), as well as the optionally contained (meth)acrylic acid ester unit (D) and other monomer units (e.g., the unit (A1) and the unit (B1)) in the above-described ionomer resin.

In one embodiment of the present invention, the melt flow rate (MFR) of the ethylene-(meth)acrylic acid ester copolymer (X), which is measured in accordance with JIS K7210 at 190° C. and 2.16-kg load, is preferably 5 g/10 min or higher, more preferably 10 g/10 min or higher, still more preferably 50 g/10 min or higher, yet still more preferably 100 g/10 min or higher, but preferably 400 g/10 min or lower, more preferably 350 g/10 min or lower, still more preferably 300 g/10 min or lower, yet still more preferably 250 g/10 min or lower. When the MFR of the ethylene-(meth)acrylic acid ester copolymer (X) is equal to or higher than the above-described lower limit value and equal to or lower than the above-described upper limit value, the formability and the strength of the resulting ionomer resin are likely to be improved. The MFR of the ethylene-(meth) acrylic acid ester copolymer (X) can be adjusted by modifying the polymerization degree and the content of the (meth)acrylic acid ester unit. This MFR can be measured by, for example, the method described below in the section of Examples.

From the standpoint of improving the formability and the strength of the resulting ionomer resin, the weight-average molecular weight of the ethylene-(meth)acrylic acid ester copolymer (X) is preferably not less than 15,000 g/mol, more preferably not less than 20,000 g/mol, still more preferably not less than 30,000 g/mol, but preferably 200,000 g/mol or less, more preferably 100,000 g/mol or less. Further, from the same standpoint, the number-average molecular weight of the ethylene-(meth)acrylic acid ester copolymer (X) is preferably not less than 5,000 g/mol, more preferably not less than 10,000 g/mol, still more preferably not less than 15,000 g/mol, but preferably 100,000 g/mol or less, more preferably 50,000 g/mol or less. The above-described weight-average molecular weight and number-average molecular weight can be adjusted by modifying the amount of a polymerization initiator and/or a chain transfer agent used in the polymerization. These molecular weights (weight-average molecular weight and number-average molecular weight) of the ethylene-(meth)acrylic acid ester copolymer (X) can be measured in terms of polystyrene using columns (three TSKgel GMH$_{HR}$-H(20)HT columns connected in series) and 1,2,4-trichlorobenzene solvent at a column temperature of 140° C.

The degree of branching per 1,000 carbon atoms of the ethylene-(meth)acrylic acid ester copolymer (X) is not particularly limited; however, it is preferably 5 to 30, more preferably 6 to 20. The degree of branching can be adjusted by modifying the polymerization temperature at the time of polymerizing the copolymer (X). The degree of branching can be measured by a $^{13}$C-NMR inverse-gated decoupling method in which the ethylene-(meth)acrylic acid ester copolymer is dissolved in deuterated o-dichlorobenzene.

Examples of the strong base used for the saponification reaction in the saponification step include sodium hydroxide, potassium hydroxide, and calcium hydroxide and, from the standpoint of the solubility in a solvent used for the saponification reaction as well as the economic efficiency, the strong base is preferably sodium hydroxide and potassium hydroxide.

The amount of the strong base to be added is, for example, preferably 100 to 300 parts by mole, more preferably 120 to 250 parts by mole, still more preferably 150 to 200 parts by mole, with respect to 100 parts by mole of the (meth)acrylic acid ester unit of the ethylene-(meth)acrylic acid ester copolymer (X).

A method of adding the strong base is not particularly limited and, for example, the strong base may be added to a liquid containing the ethylene-(meth)acrylic acid ester copolymer (X) through a gas-phase portion in the reaction vessel, or may be directly added into the liquid without being passed through the gas-phase portion in the reaction vessel (intra-liquid addition of the strong base to the liquid).

Examples of the solvent used for the saponification reaction include: ethers, such as tetrahydrofuran and dioxane; halogen-containing solvents, such as chloroform and dichlorobenzene; ketones having 6 or more carbon atoms, such as methyl butyl ketone; mixed solvents of a hydrocarbon compound and an alcohol such as methanol, ethanol, 1-propanol, 2-propanol or 1-butanol; aromatic compounds, such as benzene, toluene, xylene, and ethylbenzene; and mixed solvents of an aromatic compound and an alcohol. These solvents may be used singly, or in combination of two or more thereof.

Thereamong, from the standpoint of the resin solubility before and after the saponification reaction, the solvent is preferably a mixed solvent of a hydrocarbon compound and an alcohol, or a mixed solvent of an aromatic compound and an alcohol, more preferably a mixed solvent of an aromatic compound such as toluene and an alcohol such as methanol. A ratio of a hydrocarbon compound or an aromatic compound and an alcohol in the above-described mixed solvent may be selected as appropriate in accordance with the types of the respective solvents being used and, for example, the mass ratio of a hydrocarbon compound or an aromatic compound and an alcohol (hydrocarbon compound or aromatic compound/alcohol) may be 50/50 to 90/10.

The temperature at which the saponification reaction is performed is, from the standpoint of the reactivity thereof and the solubility of the ethylene-(meth)acrylic acid ester copolymer (X), preferably 50° C. or higher, more preferably 60° C. or higher, still more preferably 70° C. or higher, yet still more preferably 80° C. or higher, particularly preferably 100° C. or higher. From the standpoint of inhibiting excessive progress of the corrosion of the transition metal caused by the saponification reaction and making it easy to adjust the content of the transition metal in the resulting ionomer resin to be 100 mg/kg or less, an upper limit of the temperature is preferably 180° C. or lower, more preferably 150° C. or lower, still more preferably 140° C. or lower, yet still more preferably 130° C. or lower, particularly preferably 120° C. or lower.

The saponification reaction may be performed in the air, or in an inert gas such as nitrogen gas or argon gas. Further, the saponification reaction may be performed under normal, increased or reduced pressure, and it is preferably performed under increased pressure.

Examples of the strong acid used for the demetallization reaction in the demetallization step include hydrochloric acid, nitric acid, sulfuric acid, and toluenesulfonic acid. From the standpoint of facilitating the removal by washing of a salt by-produced from the strong base used for the saponification reaction and the strong acid used for the demetallization reaction, the strong acid is preferably an inorganic acid, such as hydrochloric acid, nitric acid, or sulfuric acid. As a solvent used for the demetallization reaction, the same solvent as the one used for the saponification reaction can be selected.

As the amount of the strong acid to be added, an amount appropriate for controlling the content of the neutralized (meth)acrylic acid unit (B) to be an arbitrary value can be selected in accordance with the amount of the added strong base.

As for a method of adding the strong acid, for example, the strong acid may be added to a solution of a saponification product through a gas-phase portion in the reaction vessel, or may be directly added into a solution of a saponification product without being passed through the gas-phase portion in the reaction vessel (intra-liquid addition of the strong acid to the solution).

In the case of adding the strong acid to a solution of a saponification product through a gas-phase portion in the reaction vessel, from the standpoint of making the added strong acid unlikely to come into contact with the wall surface of the reaction vessel in the gas-phase portion, the strong acid is preferably added through the gas-phase portion from directly above a region of 20% or less of a distance L from the center of the reaction vessel, when the distance L is defined as the shortest distance between the center of the reaction vessel and the wall surface of the reaction vessel. Further, in the case of adding the strong acid through a gas-phase portion in the reaction vessel, from the standpoint of making the added strong acid unlikely to come into contact with the wall surface of the reaction vessel in the gas-phase portion, the strong acid is preferably added from a position at a distance of preferably 2 m or less, more preferably 1 m or less, from the solution surface. For example, in the case of supplying the strong acid into the reaction vessel via a feed line, a feed port of an addition nozzle may be arranged at a position of 2 m or less, or 1 m or less from the solution surface in a region of 20% or less of the distance L from the center of the reaction vessel, and the strong acid may be added to the solution of a saponification product through a gas-phase portion in the reaction vessel. By making the added strong acid unlikely to come into contact with the wall surface of the reaction vessel in a gas-phase portion in the above-described manner, it is made easier to control the degree of the progress of the corrosion of the transition metal caused by the strong acid and to thereby adjust the content of the transition metal in the resulting ionomer resin to be in a range of 0.01 to 100 mg/kg.

In the case of directly adding the strong acid into the solution of a saponification product without passing it through a gas-phase portion in the reaction vessel, it is preferred to arrange a feed port of an addition nozzle, from which the strong acid is added to the solution of the saponification product, at or below the surface of the solution of the saponification product, and to thereby directly add the strong acid into the solution without passing it through the gas-phase portion. It is also preferred to arrange the feed port on the bottom of the reaction vessel or on the side of the reaction vessel at or below the solution surface, and to thereby directly add the strong acid into the solution without passing it through the gas-phase portion.

In one embodiment of the present invention, from the standpoint of making it easy to adjust the content of the transition metal in the resulting ionomer resin to be 100 mg/kg or less, it is preferred to perform the above-described demetallization by adding the strong acid directly into the solution of the saponification reaction without passing the strong acid through a gas-phase portion in the reaction vessel.

In the above-described demetallization, the addition of the strong acid to the solution of the saponification product is, from the standpoint of uniformly mixing the added strong acid, preferably performed while stirring the solution in the reaction vessel. A stirring method is not particularly limited and, for example, a stirring method using an industrially commonly used stirring blade of an arbitrary shape, such as a MAXBLEND blade, a triple swept-back blade, a paddle blade, a multistage paddle blade, a turbine blade, or an anchor blade, may be employed. Among these stirring blades, from the standpoint of uniformly mixing the added strong acid, a MAXBLEND blade is preferably used for the stirring.

From the standpoint of reducing the viscosity of the resulting reaction solution, the temperature at which the above-described demetallization is performed is preferably 20° C. or higher, more preferably 30° C. or higher, still more preferably 40° C. or higher and, from the standpoint of inhibiting excessive progress of the corrosion of the transition metal caused by the demetallization reaction and making it easy to adjust the content of the transition metal in the resulting ionomer resin to be 100 mg/kg or less, the temperature is preferably 180° C. or lower, more preferably 150° C. or lower, still more preferably 120° C. or lower.

The demetallization may be performed in the air, or in an inert gas such as nitrogen gas or argon gas, in the same manner as the above-described saponification reaction. Further, the saponification reaction may be performed under normal, increased or reduced pressure, and it is preferably performed under increased pressure.

In the neutralization step of the above-described method (2), a neutralizer used for partially neutralizing the (meth)acrylic acid unit to convert it into a neutralized (meth)acrylic acid unit is not particularly limited as long as it is a compound containing a metal ion. Examples of the metal ion include: ions of alkali metals, such as lithium, sodium, and potassium; ions of alkaline earth metals, such as magnesium and calcium; and ions of transition metals, such as zinc, nickel, iron, and titanium; and an aluminum ion. For example, when the metal ion is a sodium cation, examples of the neutralizer include sodium hydroxide, sodium acetate, and sodium bicarbonate. As the neutralizer, it is also possible to use a polymer, such as an ionomer resin containing a sodium (meth)acrylate unit.

After the demetallization step or after the neutralization step if it is further included after the demetallization step, a crude ionomer resin, which is a reaction product contained in the resulting reaction solution, is separated from a reaction mixture and then purified, whereby the ionomer resin of the present invention can be obtained. This separation-purification step of performing separation and purification may be carried out by a commonly used method, for example, separation means such as filtration, washing, concentration, reprecipitation, recrystallization, or silica gel chromatography.

In one embodiment of the present invention, from the standpoint of facilitating the removal of a by-produced salt by washing, the separation-purification step is preferably performed by adding a poor solvent to a solution of the crude ionomer resin to precipitate a granular resin, and subsequently washing the thus precipitated granular resin with a washing liquid.

The solution of the crude ionomer resin can be prepared by dissolving the crude ionomer resin, which is obtained after the demetallization step or the subsequent neutralization step, in a solvent. A reaction solution obtained after the demetallization step or the subsequent neutralization step may also be used as the solution of the crude ionomer resin.

The solvent in the solution of the crude ionomer resin is not particularly limited as long as it is capable of dissolving the crude ionomer resin, and examples thereof include the same ones as those exemplified above for the solvent used for the saponification reaction. Thereamong, from the standpoint of the solubility of the crude ionomer resin, the solvent is preferably a mixed solvent of an aromatic compound such as toluene and an alcohol such as methanol. A ratio of the aromatic compound and the alcohol in the mixed solvent may be selected as appropriate in accordance with the types of the respective solvents being used and, for example, the mass ratio of the aromatic compound and the alcohol (aromatic compound/alcohol) may be 50/50 to 90/10, preferably 65/35 to 85/15.

When a granular resin having a small particle size is easily obtained and excess transition metal exists in the crude ionomer resin as a result, from the standpoint of being able to remove the excess transition metal and facilitating the removal of by-produced salt, the concentration of the solution of the crude ionomer resin is preferably 30% by mass or lower, more preferably 15% by mass or lower, but preferably 1% by mass or higher, more preferably 5% by mass or higher.

From the standpoint of inhibiting aggregation or agglutination of the precipitating granular resin and facilitating the removal of the excess transition metal and by-produced salt in the resulting ionomer resin, the temperature of the solution of the crude ionomer resin is preferably not higher than the melting point of the ionomer resin, more preferably 60° C. or lower, still more preferably 50° C. or lower. Further, from the standpoint of the fluidity of the solution of the crude ionomer resin, the above-described temperature is more preferably 25° C. or higher, still more preferably 30° C. or higher.

The poor solvent added to the solution of the crude ionomer resin is not particularly limited as long as it is mixed with the solution of the crude ionomer resin but does not dissolve the ionomer resin, and examples of the poor solvent include: alcohols, such as methanol, ethanol, 1-propanol, 2-propanol, and 1-butanol; water; ketones, such as acetone and methyl ethyl ketone; esters, such as methyl acetate and ethyl acetate; ethers, such as dimethyl ether, diethyl ether, and tetrahydrofuran; and hydrocarbon compounds, such as n-hexane, cyclohexane, and heptane. These poor solvents may be used singly, or in combination of two or more thereof. Thereamong, the poor solvent is preferably an alcohol such as methanol or 2-propanol, water, or a mixed solvent thereof, more preferably an alcohol such as methanol, since such a poor solvent not only has a low boiling point and is thus likely to facilitate the drying of the ionomer resin, but also is likely to facilitate the removal of the excess transition metal and by-produced salt from the resulting granular ionomer resin.

The amount of the poor solvent to be added may be selected as appropriate in accordance with the concentration of the solution of the crude ionomer resin. For example, the poor solvent is added in an amount of preferably not less than 30 parts by mass, more preferably not less than 60 parts by mass, particularly preferably not less than 100 parts by mass, with respect to 100 parts by mass of the solution of the crude ionomer resin. An upper limit value of the amount of the poor solvent to be added is not particularly limited, and it is usually 1,000 parts by mass or less with respect to 100 parts by mass of the solution of the crude ionomer resin.

A method of adding the poor solvent to the solution of the crude ionomer resin is not particularly limited and, for example, the poor solvent may be added to the solution of the crude ionomer resin at once, or in separate portions by dropwise addition or the like. From the standpoint of reducing the particle size of the granular resin and thereby improving the removability of the excess transition metal and by-produced salt in the granular resin and consequently improving the transparency of the resulting ionomer resin, the addition of the poor solvent is preferably performed in a relatively short time, more preferably at once. In the case of adding the poor solvent in separate portions, it is preferred to complete the addition of the poor solvent within one hour, more preferably within 30 minutes, still more preferably within 10 minutes.

After the addition of the poor solvent to the solution of the crude ionomer resin, it is preferred to stir the resulting mixture of the solution of the crude ionomer resin and the poor solvent. The stirring rate is not particularly limited; however, the higher the stirring rate, the more likely are granular particles of a small size to be obtained. The stirring time is also not particularly limited, and the stirring may be performed, for example, until granular particles are precipitated and the mixture of the solution of the crude ionomer resin and the poor solvent becomes a slurry. Specifically, the stirring time is preferably 1 second to 3 hours, more preferably 10 seconds to 1 hour, still more preferably 1 minute to 30 minutes.

From the standpoint of facilitating the removal of the by-produced salt in the granular resin by increasing the specific surface area of the granular resin and the standpoint of reducing the content of the excess transition metal and consequently adjusting the content of the transition metal in the resulting ionomer resin to be in a range of 0.01 to 100 mg/kg, the peak-top particle size of the granular resin precipitated by the addition of the poor solvent to the solution of the crude ionomer resin is 700 μm or smaller, preferably 650 μm or smaller, more preferably 600 μm or smaller, still more preferably 550 μm or smaller. Further, from the standpoint of improving the filterability of the granular resin and thereby improving the production efficiency of the ionomer resin, the peak-top particle size of the granular resin is preferably 50 μm or larger, more preferably 70 μm or larger, preferably 80 μm or larger.

The peak-top particle size of the granular resin precipitated by the addition of the poor solvent to the solution of the crude ionomer resin can be adjusted by modifying the concentration and the temperature of the solution of the crude ionomer resin. Specifically, the peak-top particle size of the granular resin to be precipitated can be reduced by lowering the concentration and/or the temperature of the solution of the crude ionomer resin, while the peak-top particle size of the granular resin to be precipitated can be increased by raising the concentration and/or the temperature of the solution of the crude ionomer resin. The peak-top particle size of the granular resin can also be adjusted by modifying the method of adding the poor solvent and the stirring rate of the mixture of the solution of the crude ionomer resin and the poor solvent.

The washing liquid used for washing the precipitated granular resin is not particularly limited as long as it is a solvent that does not dissolve the resulting ionomer resin. Examples of a preferred washing liquid include: alcohols, such as methanol, ethanol, 1-propanol, and 2-isopropanol; water; ketones, such as acetone and methyl ethyl ketone; esters, such as methyl acetate and ethyl acetate; and ethers, such as dimethyl ether, diethyl ether, and tetrahydrofuran. These washing liquids may be used singly, or in combination of two or more thereof.

Among these washing liquids, from the standpoint of facilitating the removal of the excess transition metal and by-produced salt, an alcohol, water, or a mixture thereof is preferred. Further, from the standpoint of reducing the specific gravity of the washing liquid to less than that of the granular resin and thereby increasing the contact area between the washing liquid and the granular resin to improve the removability of the transition metal and by-produced salt and facilitate the removal of impurities contained in the granular resin, such as an organic compound, as well as the standpoint of facilitating the drying of the ionomer resin obtained after the washing, the washing liquid is more preferably a mixture of water and an alcohol. The alcohol is preferably methanol or ethanol, more preferably methanol, for being easily dried and highly compatible with water.

In the mixture of water and the alcohol, the ratio of the water and the alcohol (water/alcohol (% by mass)) is preferably 20/80 to 80/20, more preferably 30/70 to 70/30.

Examples of a method of washing the granular resin with the washing liquid include a method of recovering the granular resin by filtration from a granular resin dispersion in which the granular resin is precipitated, mixing the thus recovered granular resin with the washing liquid, and subsequently removing the washing liquid. A more specific example is a method of washing by: mixing the granular resin recovered by filtration from the granular resin dispersion with the washing liquid, and subsequently recovering the granular resin from the washing liquid by filtration (hereinafter, also referred to as "washing step (a)"); and then mixing the thus recovered granular resin with new washing liquid, and subsequently recovering the granular resin from this washing liquid by filtration (hereinafter, also referred to as "washing step (b)"). From the standpoint of facilitating the removal of the transition metal and by-produced salt that are contained in the granular resin and the standpoint of the production efficiency of the ionomer resin, in the case of a batch process, the granular resin is washed by, for example, performing the washing step (a) once and then the washing step (b) preferably one to ten times, and the washing step (b) after the single washing step (a) is performed more preferably one to six times, still more preferably one to four times.

The amount of the above-described washing liquid to be used per single washing step may be selected as appropriate in accordance with the amount of the granular resin to be washed. The amount of the washing liquid to be used per single washing step is, for example, preferably 100 parts by mass to 2,000-fold amount, more preferably 200 parts by mass to 1,000 parts by mass, still more preferably 300 parts by mass to 700 parts by mass, with respect to 100 parts by mass of the dried granular resin.

The ionomer resin obtained by washing the granular resin with the washing liquid may be dried as required. The drying temperature may be preferably not higher than the melting point of the ionomer resin, more preferably 80° C. or lower.

The ionomer resin of the present invention can also be produced by a method other than the above-described production method (1). Examples of the method other than the production method (I) by which the ionomer resin of the present invention can be produced include a method in which, using ethylene and (meth)acrylic acid as raw materials, a copolymer obtained by polymerization of the raw materials is partially neutralized, and a transition metal is subsequently added to the thus obtained partial neutralization product (this method is hereinafter also referred to as "production method (II)"). In this production method (II), an ionomer resin containing 0.01 to 100 mg/kg of a transition metal can be produced by a method that includes:

the step of copolymerizing ethylene and (meth)acrylic acid to obtain an ethylene-(meth)acrylic acid copolymer (copolymerization step);

the step of partially neutralizing the thus obtained ethylene-(meth)acrylic acid copolymer with a strong base (partial neutralization step); and the step of adding a transition metal to the thus obtained partial neutralization product (addition step).

With regard to the method of obtaining a partial neutralization product by the above-described copolymerization step and partial neutralization step, reference can be made to the resin production methods disclosed in U.S. Pat. Nos. 6,518,365 B and 8,399,096 B.

A transition metal is added to the partial neutralization product obtained by the above-described copolymerization step and partial neutralization step, and the resultant is subsequently mixed, whereby an ionomer resin in which the content of the transition metal is 0.01 to 100 mg/kg can be produced. Examples of the transition metal that can be added to the partial neutralization product include the transition metals that may be contained in the ionomer resin of the present invention. The state of the transition metal at the time of being added to the resin is not particularly limited, and the transition metal may be any of, for example, a transition metal oxide, a transition metal hydroxide, a transition metal halide, and a transition metal salt, which may be added in the state of being dispersed or dissolved in a solvent.

The amount of the transition metal to be added may be selected as appropriate such that the content of the transition metal in the resulting ionomer resin is in a range of 0.01 to 100 mg/kg, and it may be, for example, $0.01\times10^{-4}$ to $100\times10^{-4}$ parts by mass, preferably $0.05\times10^{-4}$ to $50\times10^{-4}$ parts by mass, more preferably $0.1\times10^{-4}$ to $10\times10^{-4}$ parts by mass, still more preferably $0.2\times10^{-4}$ to $5\times10^{-4}$ parts by mass, with respect to 100 parts by mass of the resin obtained by the copolymerization step and the partial neutralization step.

The partial neutralization product and the transition metal may be mixed using a mixing/stirring apparatus, an extruder, or the like.

Further, the ionomer resin of the present invention can also be produced by a method in which a transition metal is added to the crude ionomer resin obtained by performing the saponification step and the demetallization step in the absence of a transition metal in the above-described production method (I) (this method is hereinafter also referred to as "production method (III)"). Moreover, the ionomer resin of the present invention can also be produced by a method in which a transition metal is added, for example, between the copolymerization step and the partial neutralization step during the production of the partial neutralization product in the above-described production method (II) (this method is hereinafter also referred to as "production method (IV)"). As the transition metal added in the production method (III) and the production method (IV), the same transition metal as the one used in the production method (II) can be used.

Among the above-described production methods (I) to (IV), from the standpoint of the simplicity of the production steps, it is preferred to produce the ionomer resin by the production method (I).

In one embodiment of the present invention, as required, additives may be added to the ionomer resin of the present invention to obtain a resin composition. This resin composition contains the ionomer resin of the present invention and the additives.

Examples of the additives that may be contained in the resin composition include an ultraviolet absorber, an age inhibitor, an antioxidant, a thermal degradation inhibitor, a light stabilizer, an agglutination inhibitor, a lubricant, a mold release agent, a polymer processing aid, an antistatic agent, a flame retardant, a dye/pigment, an organic dye, a matting agent, and a phosphor. Among these additives, an ultraviolet absorber, an age inhibitor, an antioxidant, a thermal degradation inhibitor, a light stabilizer, an agglutination inhibitor, a lubricant, a mold release agent, a polymer processing aid, and an organic dye are preferred. When added, these additives may be used singly, or in combination of two or more thereof.

In the present invention, the resin composition may also contain an adhesion promoter, such as a silane coupling agent, as an additive; however, from the standpoint of inhibiting the generation of a crosslinked gel and obtaining a resin sheet having a good appearance, it is preferred that the resin composition does not contain an adhesion promoter.

The ultraviolet absorber is a compound capable of absorbing ultraviolet rays, and is said to have a function of mainly converting light energy into heat energy. Examples of the ultraviolet absorber include benzophenones, benzotriazoles, triazines, benzoates, salicylates, cyanoacrylates, oxalic anilides, malonates, and formamidines. These ultraviolet absorbers may be used singly, or in combination of two or more thereof.

Benzotriazoles are preferred as ultraviolet absorbers since they have a high effect of inhibiting deterioration of the optical properties, such as coloring caused by exposure to ultraviolet rays. Examples of a preferred benzotriazole include 2-(2H-benzotriazol-2-yl)-4-(1,1,3,3-tetramethylbutyl)phenol (trade name: TINUVIN 329, manufactured by BASF Ltd.), 2-(2H-benzotriazol-2-yl)-4,6-bis(1-methyl-1-phenylethyl)phenol (trade name: TINUVIN 234, manufactured by BASF Ltd.), 2,2'-methylene-bis[6-(2H-benzotriazol-2-yl)-4-t-octylphenol] (LA-31, manufactured by ADEKA Corporation), and 2-(5-octylthio-2H-benzotriazol-2-yl)-6-tert-butyl-4-methylphenol. These benzotriazoles may be used singly, or in combination of two or more thereof.

Examples of triazine ultraviolet absorbers include 2,4,6-tris(2-hydroxy-4-hexyloxy-3-methylphenyl)-1,3,5-triazine (LA-F70, manufactured by ADEKA Corporation) and its analogs that are hydroxyphenyltriazine-based ultraviolet absorbers (TINUVIN 477 and TINUVIN 460, manufactured by BASF Ltd.), and 2,4-diphenyl-6-(2-hydroxy-4-hexyloxyphenyl)-1,3,5-triazine. These triazines may be used singly, or in combination of two or more thereof.

As the age inhibitor, known materials are exemplified. Specific examples of the age inhibitor include: phenolic compounds, such as hydroquinone, hydroquinone monomethyl ether, 2,5-di-t-butylphenol, 2,6-di(t-butyl)-4-methylphenol, and mono-(or di-, or tri-)(α-methylbenzyl)phenol; bisphenolic compounds, such as 2,2'-methylene-bis(4-ethyl-6-t-butylphenol), 4,4'-butylidene-bis(3-methyl-6-t-butylphenol), and 4,4'-thiobis(3-methyl-6-t-butylphenol); benzimidazole compounds, such as 2-mercaptobenzimidazole and 2-mercaptomethylbenzimidazole; amine-ketone compounds, such as 6-ethoxy-1,2-dihydro-2,2,4-trimethylquinoline, a reaction product of diphenylamine and acetone, and 2,2,4-trimethyl-1,2-dihydroquinoline polymers; aromatic secondary amine compounds, such as N-phenyl-1-naphthylamine, alkylated diphenylamine, octylated diphenylamine, 4,4'-bis(α,α-dimethylbenzyl)diphenylamine, p-(p-toluenesulfonylamide)diphenylamine, and N,N'-diphenyl-p-phenylenediamine; and thiourea compounds, such as 1,3-bis(dimethylaminopropyl)-2-thiourea and tributyl thiourea. These age inhibitors may be used singly, or in combination of two or more thereof.

The antioxidant has an effect of inhibiting oxidative degradation of a resin by itself in the presence of oxygen. Examples of the antioxidant include phosphorus-based antioxidants, hindered phenol-based antioxidants, and thioether-based antioxidants. These antioxidants may be used singly, or in combination of two or more thereof. Thereamong, from the standpoint of the effect of inhibiting deterioration of the optical properties due to coloring, phosphorus-based antioxidants and hindered phenol-based antioxidants are preferred, and a combination of a phosphorus-based antioxidant and a hindered phenol-based antioxidant is more preferred.

When a phosphorus-based antioxidant and a hindered phenol-based antioxidant are used in combination, the amount of the phosphorus-based antioxidant to be used and that of the hindered phenol-based antioxidant to be used is, in terms of mass ratio (phosphorus-based antioxidant:hindered phenol-based antioxidant), preferably 1:5 to 2:1, more preferably 1:2 to 1:1.

Examples of a preferred phosphorus-based antioxidant include 2,2-methylene-bis(4,6-di-t-butylphenyl)octyl phosphite (trade name: ADK STAB HP-10, manufactured by ADEKA Corporation), tris(2,4-di-t-butylphenyl)phosphite (trade name: 1RGAFOS 168, manufactured by BASF Ltd.), and 3,9-bis(2,6-di-t-butyl-4-methylphenoxy)-2,4,8,10-tetraoxa-3,9-diphosphaspiro[5.5]undecane (trade name: ADK STAB PEP-36, manufactured by ADEKA Corporation). These phosphorus-based antioxidants may be used singly, or in combination of two or more thereof.

Examples of a preferred hindered phenol-based antioxidant include pentaerythrityl-tetrakis[3-(3,5-di-t-butyl-4-hydroxyphenyl)propionate] (trade name: IRGANOX 1010, manufactured by BASF Ltd.) and octadecyl-3-(3,5-di-t-butyl-4-hydroxyphenyl)propionate (trade name: IRGANOX 1076, manufactured by BASF Ltd.). These hindered phenol-based antioxidants may be used singly, or in combination of two or more thereof.

The thermal degradation inhibitor can inhibit thermal degradation of a resin by capturing polymer radicals that are generated when the resin is exposed to high heat in a substantially oxygen-free condition. Examples of a preferred thermal degradation inhibitor include 2-t-butyl-6-(3'-t-butyl-5'-methyl-hydroxybenzyl)-4-methylphenyl acrylate (trade name: SUMILIZER GM, manufactured by Sumitomo Chemical Co., Ltd.) and 2,4-di-t-amyl-6-(3',5'-di-t-amyl-2'-hydroxy-α-methylbenzyl)phenyl acrylate (trade name: SUMILIZER GS, manufactured by Sumitomo Chemical Co., Ltd.). These thermal degradation inhibitors may be used singly, or in combination of two or more thereof.

The light stabilizer is a compound that is said to have a function of capturing radicals mainly generated by oxidation caused by light. Examples of a preferred light stabilizer include hindered amines, such as compounds having a 2,2,6,6-tetraalkylpiperidine skeleton. These light stabilizers may be used singly, or in combination of two or more thereof.

Examples of the agglutination inhibitor include fatty acid salts or esters, polyhydric alcohol esters, inorganic salts, inorganic oxides, and particulate resins. Examples of a preferred agglutination inhibitor include calcium stearate, calcium carbonate, calcium sulfate, magnesium sulfate, barium sulfate, silicon dioxide (trade name: AEROSIL, manufactured by Evonik Degussa GmbH), and particulate acrylic resins. These agglutination inhibitors may be used singly, or in combination of two or more thereof.

Examples of the lubricant include stearic acid, behenic acid, stearamide acid, methylene bis-stearamide, hydroxystearic acid triglyceride, paraffin waxes, ketone waxes, octyl alcohol, and hardened oils. These lubricants may be used singly, or in combination of two or more thereof.

Examples of the mold release agent include: higher alcohols, such as cetyl alcohol and stearyl alcohol; and glycerin higher fatty acid esters, such as stearic acid monoglyceride and stearic acid diglyceride. These mold release agents may be used singly, or in combination of two or more thereof.

As the polymer processing aid, polymer particles having a particle size of 0.05 to 0.5 μm, which can be produced by an emulsion polymerization method, are usually used. The polymer particles may be single-layer particles composed of a polymer having a single composition ratio and a single limiting viscosity, or may be multilayer particles composed of two or more kinds of polymers having different composition ratios or limiting viscosities. These polymer processing aids may be used singly, or in combination of two or more thereof. Thereamong, particles having a two-layer structure that has a low-limiting-viscosity polymer layer as an inner layer and a polymer layer with a high limiting viscosity of 5 dl/g or higher as an outer layer are preferred. The limiting viscosity of the polymer processing aid is preferably 3 to 6 dl/g. An excessively low limiting viscosity tends to result in a low formability-improving effect, while an excessively high limiting viscosity tends to cause deterioration in the formability of copolymer.

As the organic dye, for example, a compound having a function of converting ultraviolet rays into visible light is preferably used. Such an organic dye may be used singly, or in combination of two or more thereof.

Examples of the phosphor include fluorescent pigments, fluorescent dyes, fluorescent white dyes, fluorescent brighteners, and fluorescent bleaching agents. These phosphors may be used singly, or in combination of two or more thereof.

In the case of adding the above-described additives, the content thereof can be selected as appropriate within a range that does not impair the effects of the present invention, and a total content of the additives is preferably 7% by mass or less, more preferably 5% by mass or less, still more preferably 4% by mass or less, with respect to a total mass of the resin composition.

The additives may be added at the time of producing the ionomer resin, after the production of the ionomer resin, or during the production of the below-described resin sheet.

The ionomer resin of the present invention and the resin composition in the present invention may be made into the form of pellets or the like so as to improve the convenience in storage, transportation, or forming. In a case where the ionomer resin and the resin composition is pelletized, pellets can be obtained by, for example, cutting strands thereof obtained by a melt extrusion method. In the case of performing pelletization by a melt extrusion method, from the standpoint of stabilizing the discharge from an extruder, the temperature of the resin or the resin composition during melt extrusion is preferably 150° C. or higher, more preferably 170° C. or higher. Further, from the standpoint of inhibiting deterioration of the resin caused by thermal decomposition, the above-described temperature is preferably 250° C. or lower, more preferably 230° C. or lower. The ionomer resin of the present invention and the resin composition in the present invention has a high thermal decomposition resistance; therefore, during the pelletization performed by a melt extrusion method in the above-described manner, problems such as generation of a black foreign matter due to thermal decomposition of the ionomer resin are unlikely to occur.

[Resin Sheet]

The present invention also encompasses a resin sheet that includes one or more layers containing the ionomer resin of the present invention. The resin sheet of the present invention has at least one layer containing the ionomer resin of the present invention (hereinafter, also referred to as "layer (x)"). The layer (x) is a layer containing the ionomer resin of the present invention or the resin composition in the present invention.

The resin sheet of the present invention may consist of the layer (x), or may be a laminate that includes at least one layer (x). This laminate is not particularly limited, and examples thereof include a laminate that includes two or more layers (x), and a laminate that includes at least one layer (x) and at least one other layer. When there are plural layers (x) or plural other layers, these layers may be formed of the same resin or resin composition, or different resins or resin compositions.

Examples of the above-described other layer include a layer containing a known resin. As this resin, for example, any of the following can be used: polyethylenes, polypropylenes, polyvinyl chlorides, polystyrenes, polyurethanes, polytetrafluoroethylenes, acrylic resins, polyamides, polyacetals, polycarbonates, polyethylene terephthalate and polybutylene terephthalate among polyesters, cyclic polyolefins, polyphenylene sulfides, polytetrafluoroethylenes, polysulfones, polyether sulfones, polyarylates, liquid-crystal polymers, polyimides, and thermoplastic elastomers. Further, as required, the other layer may also contain the above-described additives as well as one or more other additives, such as a plasticizer, an antiblocking agent, a pigment, a dye, a heat-shielding material (e.g., inorganic heat-shielding fine particles or organic heat-shielding material having an infrared absorbing capacity), and a functional inorganic compound.

In one embodiment of the present invention, from the standpoint of obtaining excellent foam removability at the time of thermal compression bonding of the resin sheet of the present invention and a substrate, the surface of the resin sheet of the present invention preferably has an irregular structure formed by a conventionally known method, such as melt fractures and embossing. As the shapes of the melt fractures and embossing, conventionally known shapes may be selected as appropriate.

In the resin sheet of the present invention, the thickness of a single layer (x) is preferably not less than 0.1 mm, more preferably not less than 0.2 mm, still more preferably not less than 0.3 mm, particularly preferably not less than 0.4 mm, but preferably 5 mm or less, more preferably 4 mm or less, still more preferably 2 mm or less, particularly preferably 1 mm or less. When the resin sheet has plural layers (x), these plural layers (x) in the resin sheet may be the same or different in thickness.

The thickness of the resin sheet of the present invention is preferably not less than 0.1 mm, more preferably not less than 0.2 mm, still more preferably not less than 0.3 mm, yet still more preferably not less than 0.4 mm, particularly preferably not less than 0.5 mm, particularly more preferably not less than 0.6 mm, particularly still more preferably not less than 0.7 mm, especially preferably not less than 0.75 mm, but preferably 20 mm or less, more preferably 15 mm or less, still more preferably 10 mm or less, yet still more preferably 5 mm or less, particularly preferably 4 mm or less, especially preferably 2 mm or less, especially more preferably 1 mm or less.

The thickness of the resin sheet is measured by a conventionally known method using, for example, a contact-type or non-contact-type thickness gauge. The resin sheet may be in the state of being wound into a roll form, or may be in the state of an individual sheet.

In a preferred embodiment of the present invention, the resin sheet of the present invention may have the haze, the haze after water absorption, the haze after slow cooling, the adhesion with glass, and the yellowness of the ionomer resin of the present invention.

From the standpoint of making foaming unlikely to occur in the production of a laminated glass, the resin sheet of the present invention preferably has a low water content. The water content of the resin sheet is preferably 1% by mass or less, more preferably 0.5% by mass or less, still more preferably 0.02% by mass or less, particularly preferably 0.01% by mass or less. The water content can be measured by a coulometric titration method.

[Method of Producing Resin Sheet]

A method of producing the resin sheet of the present invention is not particularly limited. For example, after uniformly kneading the ionomer resin of the present invention and optional additives, the layer (x) can be produced by a known film-forming method, such as an extrusion method, a calender method, a press method, a solution casting method, a melt casting method, or an inflation method. The thus obtained layer (x) may be used by itself as the resin sheet. Alternatively, as required, two or more layers (x), or a combination of at least one layer (x) and at least one other layer may be laminated by press forming or the like to obtain a laminated resin sheet, or two or more layers (x), or a combination of at least one layer (x) and at least one other layer may be formed by a coextrusion method to obtain a laminated resin sheet. When there are plural layers (x) or plural other layers, these layers may be formed of the same resin or resin composition, or different resins or resin compositions.

Among the known film-forming methods, a method of producing the resin sheet using an extruder is particularly preferably employed. From the standpoint of stabilizing the discharge of the resin from the extruder and reducing machine trouble, the resin temperature during extrusion is preferably 150° C. or higher, more preferably 170° C. or higher. From the standpoint of reducing decomposition of the resin as well as deterioration of the resin associated with the decomposition, the resin temperature during the extrusion is also preferably 250° C. or lower, more preferably 230° C. or lower. Further, for the efficient removal of a volatile substance, it is preferred to remove the volatile substance from a vent port of the extruder by vacuuming.

[Laminated Glass Intermediate Film and Laminated Glass]

The resin sheet of the present invention can be suitably used as a laminated glass intermediate film (hereinafter, also simply referred to as "intermediate film"). Accordingly, the present invention encompasses a laminated glass intermediate film consisting of the resin sheet of the present invention. The present invention also encompasses a laminated glass that includes: two glass plates; and the laminated glass intermediate film of the present invention which is arranged between the two glass plates. The laminated glass of the present invention can have excellent transparency since it includes a laminated glass intermediate film consisting of the above-described resin sheet.

As the glass plates to be laminated with the intermediate film of the present invention, for example, inorganic glass plates such as a float glass plate, a polished glass plate, a figured glass plate, a wire-reinforced glass plate, and a heat-absorbing glass plate, as well as conventionally known organic glass plates of polymethyl methacrylate, polycarbonate, or the like can be used. These glass plates may be either colorless or colored. These glass plates may be used singly, or in combination of two or more thereof. The thickness of each glass plate is preferably 100 mm or less, and the two glass plates may be the same or different in thickness.

A laminated glass in which the resin sheet of the present invention is interposed between two sheets of glass can be produced by a conventionally known method. Examples thereof include a method using a vacuum laminator, a method using a vacuum bag, a method using a vacuum ring, and a method using a nip roll. Examples also include a method of performing temporary press bonding by the above-described method, subsequently putting the resultant into an autoclave, and then performing main press bonding.

In the case of using a vacuum laminator, for example, the glass plates, the intermediate film, and an optional layer(s) (e.g., an adhesive resin layer) are laminated under reduced pressure of $1\times10^{-6}$ to $1\times10^{-1}$ MPa at 60 to 200° C., particularly at 80 to 160° C., whereby a laminated glass can be produced. Methods using a vacuum bag or a vacuum ring are disclosed in, for example, EP 1,235,683 B, and a laminated glass can be produced by laminating the glass plates, the intermediate film, and an optional layer(s) under a pressure of about $2\times10^{-2}$ to $3\times10^{-2}$ MPa at 100 to 160° C.

One example of a production method using a nip roll is a method of laminating the glass plates, the intermediate film, and an optional layer(s), subsequently degassing the resultant using a roll at a temperature of not higher than the flow stall temperature of the intermediate layer, and then performing press-bonding at a temperature close to the flow start temperature. Specifically, for example, a method of heating the materials to 30 to 70° C. using an infrared heater or the like, subsequently performing degassing using a roll, further heating the resultant to 50 to 120° C., and then performing press-bonding may be employed.

When the materials are press-bonded by the above-described method and subsequently put into an autoclave to be further press-bonded, the operating conditions of the autoclaving step are selected as appropriate in accordance with the thickness and the constitution of the resulting laminated glass. For example, a treatment under a pressure of 0.5 to 1.5 MPa at 100 to 160° C. for 0.5 to 3 hours is preferred.

The ionomer resin of the present invention has high transparency and exhibits high adhesion with glass; therefore, the laminated glass of the present invention is excellent in transparency. In one embodiment of the present invention, when the intermediate film has a sheet thickness of 0.8 mm, the haze of the laminated glass is preferably 1.0% or less, more preferably 0.8% or less, still more preferably 0.5% or less. The lower the haze, the higher the transparency of the ionomer resin is; therefore, a lower limit value of the haze is not particularly limited and may be, for example, 0.01%. The haze of the laminated glass is measured using a haze meter in accordance with JIS K7136:2000.

In one embodiment of the present invention, the laminated glass of the present invention has excellent transparency even after being heated to 140° C. and then slowly cooled from 140° C. to 23° C. at a rate of 0.1° C./min. When the laminated glass in which the intermediate film has a sheet thickness of 0.8 mm is heated to 140° C. and then slowly cooled from 140° C. to 23° C. at a rate of 0.1° C./min, the haze (haze after slow cooling) of the laminated glass is preferably 5.0% or less, more preferably 4.5% or less, still more preferably 4.0% or less, particularly preferably 3.0% or less. The lower this haze, the higher is the transparency of the laminated glass; therefore, a lower limit value of the haze after slow cooling is not particularly limited and may be, for example, 0.01%. The haze after slow cooling is also measured using a haze meter in accordance with JIS K7136: 2000.

The laminated glass of the present invention is preferably as colorless as possible with limited coloring. When the intermediate film has a sheet thickness of 0.8 mm, the yellowness (YI) of the laminated glass of the present invention is preferably 2.0 or less, more preferably 1.8 or less, still more preferably 1.5 or less, particularly preferably 1.0 or less. The lower the yellowness (YI), the less is the coloring of the ionomer resin; therefore, a lower limit value of the yellowness (YI) is not particularly limited and may be, for example, 0. The yellowness (YI) is measured using a colorimetric color-difference meter in accordance with JIS 28722.

The adhesion of the intermediate film with glass in the laminated glass of the present invention can be evaluated using the peeling energy between glass and the ionomer resin, which is measured by a peeling test. The peeling energy between glass and the ionomer resin, which is measured in a standard condition (23° C., 50% RH), is preferably not less than 2 kJ/m$^2$, more preferably not less than 2.5 kJ/m$^2$, still more preferably not less than 3 kJ/m$^2$, particularly preferably not less than 3.5 kJ/m$^2$. Further, the adhesion of the intermediate film with glass under high-humidity conditions can be evaluated using the peeling energy between glass and the ionomer resin, which is measured by a peeling test performed in a wet condition. The peeling energy between glass and the ionomer resin, which is measured in a wet condition, is preferably not less than 0.05 kJ/m$^2$, more preferably not less than 0.1 kJ/m$^2$, still more preferably not less than 0.15 kJ/m$^2$, particularly preferably not less than 0.2 kJ/m$^2$. An upper limit of the peeling energy in the standard condition and that of the peeling energy under high-humidity conditions are not particularly limited, and may each be 10 kJ/m$^2$ or less. The peeling test can be performed in accordance with, for example, the method disclosed in WO 2019/027865 A as "Peel Adhesion Measurement". The peeling energy in the standard condition and that in a wet condition can be measured by, for example, the method described below in the section of Examples.

The adhesion of the intermediate film with the glass plates in the laminated glass of the present invention can also be evaluated by, for example, the compression shear strength test disclosed in WO 1999/058334 A. From the standpoint of improving the adhesive strength, the compression shear strength is preferably not less than 15 MPa, more preferably not less than 20 MPa, particularly preferably not less than 25 MPa. Meanwhile, from the standpoint of improving the penetration resistance of the laminated glass, the compression shear strength may be 50 MPa or less.

As described above, a resin sheet that includes at least one layer containing the ionomer resin of the present invention is useful as a laminated glass intermediate film. Such a laminated glass intermediate film is excellent in adhesion with a substrate such as glass, transparency, and self-supportability; therefore, it is particularly preferred as an intermediate film of a laminated glass for a structural material. In addition, the laminated glass intermediate film is suitable not only as an intermediate film of a laminated glass for a structural material, but also as a laminated glass intermediate film that is used in, but not limited to, a variety of applications including mobile bodies such as automobiles, as well as buildings and solar cells.

EXAMPLES

The present invention will now be described more concretely by way of Examples and Comparative Examples; however, the present invention is not limited to the below-described Examples.

[Contents of Monomer Units]

(Raw Material Resin)

The ethylene-(meth)acrylic acid ester copolymers used as raw materials in Examples and Comparative Examples were each dissolved in deuterated toluene or deuterated THF, and the composition of each resultant was quantified by $^1$H-NMR (400 MHz, manufactured by JEOL Ltd.).

(Ionomer Resin)

For the ionomer resins obtained in Examples and Comparative Examples, the contents of the (meth)acrylic acid unit (A), the neutralized (meth)acrylic acid unit (B), the ethylene unit (C), and the (meth)acrylic acid ester unit (D) in each ionomer resin were analyzed as follows.

Each ionomer resin obtained in Examples and Comparative Examples was dissolved in a dehydrated toluene/dehydrated acetic acid (75/25% by mass) mixed solvent, allowed to react at 100° C. for 2 hours, and subsequently reprecipitated in an acetone/water (80/20% by mass) mixed solvent to convert the neutralized (meth)acrylic acid unit (B) into the (meth)acrylic acid unit (A). The thus obtained resin was thoroughly washed with water and then dried, after which the following (1) to (3) were performed for the thus dried resin.

(1) The components of the monomer units constituting the resin were analyzed by pyrolysis GC-MS.

(2) The acid value of the resin was measured in accordance with JIS K0070:1992.

(3) the resin was subjected to the $^1$H-NMR measurement (400 MHz, manufactured by JEOL Ltd.) using a mixed solvent of deuterated toluene and deuterated methanol.

(4) The ionomer resins obtained in Examples and Comparative Examples were each subjected to a microwave digestion pretreatment with nitric acid, and the type and the amount of the metal ion of the neutralized (meth)acrylic acid unit (B) were identified by ICP emission spectrometry ("iCAP6500Duo", manufactured by Thermo Fisher Scientific, Inc.).

From the above (1), the types and the structures of the (meth)acrylic acid ester unit (D) and the (meth)acrylic acid unit (A) were identified. From the thus obtained information as well as the information of the above (2) and (3), the ratio of ethylene unit (C)/(meth)acrylic acid ester unit (D)/(total amount of (meth)acrylic acid unit (A) and neutralized (meth)acrylic acid unit (B)) was calculated. Further, from the information of the above (4), the ratio of ethylene unit (C)/(meth)acrylic acid ester unit (D)/(meth)acrylic acid unit (A)/neutralized (meth)acrylic acid unit (B) was calculated.

[Content of Transition Metal in Ionomer Resins]

First, 6.0 ml of nitric acid was added to 0.1 g of each ionomer resin obtained in Examples and Comparative Examples, and digestion was performed using a microwave digester ("Discover SP-D80", manufactured by CEM Corporation). The digestion was performed by putting the nitric acid-added ionomer resin into a vessel provided in the microwave digester, raising the temperature from an initial temperature (23° C.) to 210° C. over a period of 4 minutes, subsequently maintaining the temperature at 210° C. for 4 minutes, and then cooling the vessel to a temperature of 80° C. using an air-cooling fan provided in the digester.

After the cooling, the resulting solution of digestion product was diluted in a 50-ml PFA volumetric flask and then filtered through a 0.45 μm-thick filtration filter, and the transition metal content in the resin composition was measured by high-frequency inductively-coupled plasma emission spectrometry ("iCAP6500Duo", manufactured by Thermo Fisher Scientific, Inc.).

[Fluidity (Melt Flow Rate (MFR))]

In accordance with HS K7210, the melt flow rate was measured for the raw material resins used in Examples and Comparative Examples and the ionomer resins obtained in Examples and Comparative Examples. Specifically, each resin was melted in a cylinder and extruded from a die having a nominal pore diameter of 2.095 mm, which was arranged on the bottom of the cylinder, under the conditions of 190° C. and 2.16-kg load, and the amount of the resin extruded per 10 minutes (g/10 min) was measured.

[Thermal Decomposition Resistance]

In accordance with JIS K7120:1987, the thermal decomposition resistance was evaluated for the ionomer resins obtained in Examples and Comparative Examples. Specifically, using a thermogravimetric differential thermal analyzer TG-DTA 7200 (manufactured by Hitachi High-Tech Science Corporation), the weight reduction rate was measured when each resin was heated from 20° C. to 550° C. in a nitrogen atmosphere at a heating rate of 10° C./min and a flow rate of 50 mL/min. The 1% weight reduction temperature (Td1), which is the temperature at which the weight reduction rate was 1% based on the weight measured at 200° C., was used as an index of the thermal decomposition resistance.

[Yellowness (YI)]

Each ionomer resin obtained in Examples and Comparative Examples was melt-kneaded at 210° C., and the resulting melt-kneaded product was compression-formed for 5 minutes at a pressure of 4.9 MPa (50 kgf/cm$^2$) with heating at 210° C. to obtain a resin sheet having a thickness of 0.8 mm. The thus obtained resin sheet was measured in accordance with JIS 28722 using a colorimetric color-difference meter "ZE-2000" (trade name) manufactured by Nippon Denshoku Industries Co., Ltd. The value of yellowness that was calculated in accordance with JIS K7373 based on the thus measured value was defined as yellow index (YI).

[Transparency (Haze after Water Absorption) Under High-Humidity Conditions]

The transparency under high-humidity conditions was evaluated by measuring the haze after water absorption by the following method. A resin sheet obtained in the same manner as described above was cut out into a size of 50 mm square, and the thus obtained sample was maintained for 300 hours in a state of being immersed in 23° C. ion-exchanged water to prepare a water-absorbed sample. The water-absorbed sample was subsequently taken out of the ion-exchanged water, and water adhering to the surface thereof was wiped off, after which the haze of this water-absorbed sample was measured in accordance with JIS K7136:2000 using a haze meter HZ-1 (manufactured by Saga Test Instruments Co., Ltd.).

[Transparency after Slow Cooling (Haze After Slow Cooling)]

A resin sheet obtained in the same manner as described above was interposed between two float glass sheets of 2.7 mm in thickness, and the resultant was pressed for 5 minutes at 30 kPa using a vacuum laminator (1522N, manufactured by Nisshinbo Mechatronics Inc.) inside of which was vacuumed for 1 minute at 100° C., while maintaining the vacuum degree and the temperature, to obtain a temporarily bonded body. This temporarily bonded body was put into an autoclave and treated for 30 minutes at 140° C. and 1.2 MPa to obtain a laminated glass having a size of 30 cm square.

The laminated glass obtained by the above-described method was heated to 140° C. and then cooled to 23° C. at a rate of 0.1° C./min. After this slow cooling operation, the haze of the laminated glass was measured in accordance with JIS K7136:2000 using a haze meter HZ-1 (manufactured by Suga Test Instruments Co., Ltd.).

[Adhesion with Glass under Standard Condition (Dry Condition)]

For a laminated glass obtained in the same manner as described above, in accordance with the method described in WO 2019/027865 A as "Peel Adhesion Measurement", the peel strength $P_{Dry}$ was measured by conducting a peeling test in the 90° direction at a rate of 1 cm/min under the conditions of 23° C. and 50% RH using a universal tester (MTS Criterion M45). From the thus measured peel strength $P_{Dry}$ and the width W of the peeling test piece, the peeling energy γ under dry condition was calculated by the following equation:

$$\text{Peeling energy } \gamma_{Dry} \text{ [kJ/m}^2\text{] under dry condition}=P_{Dry} \text{ [kJ/m]}/W \text{ [m]}$$

[Adhesion with Glass under Wet Condition]

The adhesion with glass under high-humidity conditions was evaluated by measuring the peeling energy under a wet condition in accordance with the following method. For a laminated glass obtained in the same manner as described above, in accordance with the method described in WO 2019/027865 A as "Peel Adhesion Measurement", a peeling test was conducted in the 90° direction at a rate of 1 cm/min under the conditions of 23° C. and 50% RH using a universal tester (MTS Criterion M45). Once the test piece was peeled by 100 mm, water was dropped between the glass and the peeled surface to create a wet condition, and peeling was resumed at a rate of 0.025 cm/min to measure the peel strength $P_{Wet}$ in this wet condition. From the thus measured peel strength $P_{Wet}$ and the width W of the peeling test piece, the peeling energy $\gamma_{Wet}$ under wet condition was calculated by the following equation:

$$\text{Peeling energy } \gamma_{Wet} \text{ [kJ/m}^2\text{] under wet condition}=P_{Wet} \text{ [kJ/m]}/W \text{ [m]}$$

[Evaluation of Appearance of Resin Sheet]

A laminated glass having a size of 30 cm square, which was obtained in the same manner as described above, was visually observed, and the presence or absence of a gelled product of the resin sheet was checked to evaluate the appearance based on the following criteria.

A: The number of observed gelled products was less than 5.

B: The number of observed gelled products was 5 or more.

In the above criteria, an evaluation "A" means good appearance of the resin sheet.

[Raw Material Resin]

For each ethylene-(meth)acrylic acid ester copolymer (X) that was used as a raw material of an ionomer resin in Examples and Comparative Examples, the methyl methacrylate (MMA) modification amount or the ethyl acrylate (EA) modification amount, and the MFR are shown in Table 1.

For example, "ACRYFT" (registered trademark) WK307 manufactured by Sumitomo Chemical Co., Ltd. and "REXPEARL" (registered trademark) A4250 manufactured by Japan Polyethylene Corporation can be used as EMMA1 and EEA1, respectively.

TABLE 1

| | MMA or EA modification amount | | MFR |
|---|---|---|---|
| | % by mass | % by mole | g/10 min |
| EMMA1 | 25 | 8.5 | 7 |
| EMMA2 | 25 | 8.5 | 150 |
| EMMA3 | 18 | 5.8 | 7 |
| EEA1 | 25 | 8.5 | 5 |

[Materials of Reaction Vessel]

Shown below are the materials and their compositions of the reaction vessels in which saponification reaction and demetallization reaction of an ethylene-(meth)acrylic acid ester copolymer (X) were performed in Examples and Comparative Examples where the ethylene-(meth)acrylic acid ester copolymer (X) was used as a raw material.

HASTELLOY B2: nickel=68% by mass, molybdenum=28% by mass, iron=2% by mass, chromium=1% by mass, cobalt=1% by mass HASTELLOY C22: nickel=56% by mass, molybdenum=13% by mass, iron=3% by mass, chromium=22% by mass, other=6% by mass SUS312L: nickel=20% by mass, molybdenum=7% by mass, iron=47% by mass, chromium=21% by mass, other=5% by mass SUS316L: nickel=15% by mass, molybdenum=3% by mass, iron=59% by mass, chromium=18% by mass, other=5% by mass SUS304: nickel=11% by mass, iron=64% by mass, chromium=20% by mass, other=5% by mass SUS316: nickel=14% by mass, molybdenum=3% by mass, iron=60% by mass, chromium=18% by mass, other=5% by mass Example 1

A pressure-resistant vessel made of HASTELLOY B2 and equipped with a MAXBLEND blade was used as a reaction vessel. To this reaction vessel, 100 parts by mass of EMMA1 shown in Table 1 was introduced, and 233 parts by mass of toluene was added thereto, followed by stirring at 60° C. under a pressure of 0.02 MPa to dissolve EMMA1. To the thus obtained solution, 96 parts by mass of a sodium hydroxide methanol solution (20% by mass) was added, and this solution was stirred at 100° C. for 4 hours to saponify EMMA1 and thereby convert some of the methyl methacrylate units into sodium methacrylate units. Subsequently, the resulting reaction solution was cooled to 50° C., and 83 parts by mass of hydrochloric acid (20% by mass) was directly added thereto, followed by 1-hour stirring at 50° C. to convert some of the sodium methacrylate units into methacrylic acid, whereby a crude ionomer resin solution was obtained.

The thus obtained crude ionomer resin solution was diluted by adding thereto a mixed solvent of toluene and methane (75/25% by mass) such that the crude ionomer resin concentration was 10% by mass. Subsequently, after adjusting the thus obtained diluted crude ionomer resin solution to 34° C., 34° C. methanol was added thereto in an amount of 430 parts by mass with respect to 100 parts by mass of the crude ionomer resin solution to precipitate a granular resin. Then, the precipitated granular resin was recovered by filtration, and 100 parts by mass of the thus recovered granular resin was mixed with 600 parts by mass of a mixed solvent of water and methanol (50/50% by mass). A slurry obtained by the mixing was stirred at 40° C. for 1 hour, after which the granular resin was recovered by filtration at room temperature. This washing of the granular resin with the mixed solvent of water and methanol was performed three more times, whereby a washed ionomer resin was obtained.

The thus obtained ionomer resin was vacuum-dried for at least 8 hours and then analyzed to evaluate its properties. The analysis results and the evaluation results of this ionomer resin 1 are shown in Tables 2 and 3.

Example 2

An ionomer resin was obtained in the same manner as in Example 1, except that a pressure-resistant vessel made of HASTELLOY C22 was used as the reaction vessel in place of the pressure-resistant vessel made of HASTELLOY B2, and EMMA2 was used in place of EMMA1. The analysis results and the evaluation results of the thus obtained ionomer resin are shown in Tables 2 and 3.

Example 3

An ionomer resin was obtained in the same manner as in Example 1, except that a pressure-resistant vessel made of HASTELLOY C22 was used as the reaction vessel in place of the pressure-resistant vessel made of HASTELLOY B2, EMMA2 was used in place of EMMA1, and hydrochloric acid was added dropwise to the reaction solution through a gas-phase portion from a nozzle positioned above the reaction vessel at a distance of 1 m from the solution surface. The analysis results and the evaluation results of the thus obtained ionomer resin are shown in Tables 2 and 3.

Example 4

An ionomer resin was obtained in the same manner as in Example 1, except that a pressure-resistant vessel made of SUS312L was used as the reaction vessel in place of the pressure-resistant vessel made of HASTELLOY B2, and EMMA2 was used in place of EMMA1. The analysis results and the evaluation results of the thus obtained ionomer resin are shown in Tables 2 and 3.

Example 5

An ionomer resin was obtained in the same manner as in Example 1, except that a pressure-resistant vessel made of SUS316L was used as the reaction vessel in place of the pressure-resistant vessel made of HASTELLOY B2, and EEA1 was used in place of EMMA1. The analysis results and the evaluation results of the thus obtained ionomer resin are shown in Tables 2 and 3.

Example 6

With reference to the method disclosed in U.S. Pat. No. 6,518,365 B, ethylene and methacrylic acid were copolymerized to obtain an ethylene-(meth)acrylic acid copolymer, and this copolymer was subsequently partially neutralized with sodium hydroxide. To 100 parts by mass of the thus obtained partial neutralization product, $3.4 \times 10^{-4}$ parts by mass of a 20% aqueous iron (II) chloride solution was added in an extruder, whereby a transition metal-containing ionomer resin was obtained. The analysis results and the evaluation results of the thus obtained ionomer resin are shown in Tables 2 and 3.

Comparative Example 1

An ionomer resin was obtained in the same manner as in Example 1, except that a pressure-resistant vessel made of SUS304 was used as the reaction vessel in place of the pressure-resistant vessel made of HASTELLOY B2, EMMA2 was used in place of EMMA1, and hydrochloric acid was added dropwise to the reaction solution through a gas-phase portion from a nozzle positioned above the reaction vessel at a distance of 3 m from the solution surface. The analysis results and the evaluation results of the thus obtained ionomer resin are shown in Tables 2 and 3.

Comparative Example 2

An ionomer resin was obtained in the same manner as in Comparative Example 1, except that a pressure-resistant vessel made of SUS316 was used as the reaction vessel in place of the pressure-resistant vessel made of SUS304. The analysis results and the evaluation results of the thus obtained ionomer resin are shown in Table 2.

Comparative Example 3

An ionomer resin was obtained in the same manner as in Example 1, except that a pressure-resistant vessel made of HASTELLOY C22 was used as the reaction vessel in place of the pressure-resistant vessel made of HASTELLOY B2, EMMA3 was used in place of EMMA1. The analysis results and the evaluation results of the thus obtained ionomer resin are shown in Tables 2 and 3.

Comparative Example 4

With reference to the method disclosed in U.S. Pat. No. 6,518,365 B, ethylene and methacrylic acid were copolymerized to obtain an ethylene-(meth)acrylic acid copolymer, and this copolymer was subsequently partially neutralized with sodium hydroxide to obtain an ionomer resin. The analysis results and the evaluation results of the thus obtained ionomer resin are shown in Tables 2 and 3.

Comparative Example 5

A resin composition was obtained by adding, through melt-kneading, 0.2 parts by mass of 3-glycidoxypropylmethyldiethoxysilane as a silane coupling agent to 100 parts by mass of the ionomer resin obtained in Comparative Example 4. The analysis results and the evaluation results of the thus obtained resin composition are shown in Tables 2 and 3.

TABLE 2

| | | | | Ionomer resin | | | | | | | | | Additive |
| | | | | Monomer unit | | | | Transition metal | | | | | |
| | | | | | | | Total content | | | | | | Silane |
| | | Production conditions | | Unit content | | | content | | | Content | | Total | coupling |
| | Raw | Material of | Acid | A | B | D | A + B + D | | | | | content | agent |
| | material resin | reaction vessel | addition method | % by mole | % by mole | % by mole | % by mole | Fe mg/kg | Ni mg/kg | Cr mg/kg | Mn mg/kg | mg/kg | phr |
|---|---|---|---|---|---|---|---|---|---|---|---|---|---|
| Example 1 | EMMA1 | HASTELLOY B2 | intra-liquid addition | 6.7 | 1.7 | 0.1 | 8.5 | 0.1 | 0 | 0 | 0 | 0.1 | — |
| Example 2 | EMMA2 | HASTELLOY C22 | intra-liquid addition | 6.7 | 1.7 | 0.1 | 8.5 | 1.0 | 0.2 | 0.1 | 0.01 | 1.3 | — |
| Example 3 | EMMA2 | HASTELLOY C22 | dropwise addition | 6.7 | 1.7 | 0.1 | 8.5 | 3.2 | 0.3 | 0.3 | 0.01 | 3.8 | — |
| Example 4 | EMMA2 | SUS312L | intra-liquid addition | 6.7 | 1.7 | 0.1 | 8.5 | 10 | 2 | 1 | 1 | 14 | — |
| Example 5 | EEA1 | SUS316L | intra-liquid addition | 6.7 | 1.7 | 0.1 | 8.5 | 6.0 | 1 | 1 | 1 | 9.0 | — |
| Example 6 | — | — | — | 6.7 | 1.7 | 0.1 | 8.5 | 0.3 | 0 | 0 | 0 | 0.3 | — |
| Comparative Example 1 | EMMA2 | SUS304 | dropwise addition | 6.7 | 1.7 | 0.1 | 8.5 | 110 | 30 | 25 | 0 | 165 | — |
| Comparative Example 2 | EMMA2 | SUS316 | dropwise addition | 6.7 | 1.7 | 0.1 | 8.5 | 87 | 12 | 14 | 10 | 123 | — |
| Comparative Example 3 | EMMA3 | HASTELLOY C22 | intra-liquid addition | 4.5 | 1.2 | 0.1 | 5.8 | 0.3 | 0.1 | 0.1 | 0.1 | 0.6 | — |
| Comparative Example 4 | — | — | — | 6.7 | 1.7 | 0.1 | 8.5 | 0 | 0 | 0 | 0 | 0 | — |
| Comparative Example 5 | — | — | — | 6.7 | 1.7 | 0.1 | 8.5 | 0 | 0 | 0 | 0 | 0 | 0.2 |

TABLE 3

| | Adhesion | | Transparency | | | | Thermal decomposition |
| | Dry condition kJ/m$^2$ | Wet condition kJ/m$^2$ | Haze after water absorption % | haze after slow cooling % | YI | Evaluation of appearance | resistance Td1 ° C. |
|---|---|---|---|---|---|---|---|
| Example 1 | 3.3 | 0.12 | 1.1 | 1.0 | 0.2 | A | 380 |
| Example 2 | 3.5 | 0.2 | 1.3 | 1.3 | 0.5 | A | 378 |
| Example 3 | 3.2 | 0.23 | 1.6 | 1.8 | 0.9 | A | 373 |
| Example 4 | 3.3 | 0.3 | 1.8 | 2.8 | 2.6 | A | 376 |
| Example 5 | 3.2 | 0.28 | 2.0 | 2.5 | 1.5 | A | 365 |
| Example 6 | 4.8 | 0.13 | 1.0 | 4.0 | 0.5 | A | 360 |
| Comparative Example 1 | 3.4 | 0.35 | 32 | 8.1 | 4.2 | A | 340 |
| Comparative Example 2 | 3.2 | 0.33 | 24 | 6.5 | 3.8 | A | 348 |
| Comparative Example 3 | 1.3 | 0.02 | 1.4 | 12 | 0.7 | A | 385 |
| Comparative Example 4 | 2.5 | 0.03 | 1.2 | 4.8 | 0.2 | A | 327 |
| Comparative Example 5 | 4.6 | 0.09 | 1.0 | 5.3 | 0.3 | B | 334 |

As shown in Table 3, it was confirmed that the ionomer resins obtained in Examples had a lower haze after water absorption, that is, a higher transparency even in a water-absorbed state; a higher peeling energy in a wet condition, that is, a higher adhesion with glass even under a high-humidity condition; and a higher thermal decomposition resistance than the ionomer resins obtained in Comparative Examples. In addition, the resin sheets produced from the ionomer resins obtained in Examples had a lower amount of gelled product and therefore had a good appearance.

The invention claimed is:

1. An ionomer resin, comprising:
a (meth)acrylic acid unit (A);
a neutralized (meth)acrylic acid unit (B); and
an ethylene unit (C),
wherein
a total content of the unit (A) and the unit (B) is 6 to 10% by mole based on all monomer units constituting the ionomer resin, and
the content of a transition metal in the ionomer resin is 0.01 to 100 mg/kg.

2. The ionomer resin according to claim 1, further comprising a (meth)acrylic acid ester unit (D),
wherein a total content of the unit (A), the unit (B), and the unit (D) is 6 to 10% by mole based on all monomer units constituting the ionomer resin.

3. The ionomer resin according to claim 1, wherein the transition metal is at least one metal selected from the group consisting of iron, nickel, manganese, and chromium.

4. A resin sheet, comprising at least one layer comprising the ionomer resin according to claim 1.

5. A laminated glass intermediate film, consisting of the resin sheet according to claim 4.

6. A laminated glass, comprising:
two glass plates; and
the laminated glass intermediate film according to claim 5, which is arranged between the two glass plates.

7. A method of producing the ionomer resin according to claim 1, the method comprising:
saponifying an ethylene-(meth)acrylic acid ester copolymer with a strong base; and
demetallizing a saponification product obtained by the saponifying with a strong acid,
wherein the saponifying and/or the demetallizing is/are performed in the presence of a transition metal.

8. The method according to claim 7, wherein the demetallizing is performed by intra-liquid addition of the strong acid to a solution of the saponification product.

9. A method of producing an ionomer resin, the method comprising:
saponifying an ethylene-(meth)acrylic acid ester copolymer with a strong base; and
demetallizing a saponification product obtained by the saponifying with a strong acid,
wherein the saponifying and/or the demetallizing is/are performed in the presence of a transition metal,
wherein:
the saponifying and/or the demetallizing is/are performed using a reaction apparatus, and
at least a portion of the reaction apparatus is formed of an alloy comprising nickel and chromium as transition metals in a total amount of not less than 50% by mass, and
wherein the ionomer resin comprises:
a (meth)acrylic acid unit (A);
a neutralized (meth)acrylic acid unit (B); and
an ethylene unit (C),
wherein
a total content of the unit (A) and the unit (B) is 6 to 10% by mole based on all monomer units constituting the ionomer resin, and
the content of a transition metal in the ionomer resin is 0.01 to 100 mg/kg.

10. The method according to claim 9, wherein the at least a portion of the reaction apparatus is at least a portion selected from the group consisting of a reaction vessel, a stirring blade, a baffle, and a feed line through which the strong base and/or the strong acid is/are supplied to the reaction vessel.

* * * * *